US008532287B2

United States Patent
Mizuno

(10) Patent No.: US 8,532,287 B2
(45) Date of Patent: Sep. 10, 2013

(54) INFORMATION PROCESSING SYSTEM AND INFORMATION PROCESSING METHOD FOR USE THEREWITH, INFORMATION PROCESSING APPARATUS AND INFORMATION PROCESSING METHOD FOR USE THEREWITH, AND PROGRAM

(75) Inventor: Hiroshi Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1241 days.

(21) Appl. No.: 11/568,843

(22) PCT Filed: Mar. 23, 2005

(86) PCT No.: PCT/JP2005/005213
§ 371 (c)(1),
(2), (4) Date: Nov. 29, 2006

(87) PCT Pub. No.: WO2005/117411
PCT Pub. Date: Dec. 8, 2005

(65) Prior Publication Data
US 2007/0223697 A1 Sep. 27, 2007

(30) Foreign Application Priority Data
May 27, 2004 (JP) .................................. 2004-158325

(51) Int. Cl.
*G06F 21/00* (2006.01)
(52) U.S. Cl.
USPC .................. 380/37; 380/27; 380/28; 380/200; 380/269; 382/100; 382/232; 713/153; 713/189; 713/193
(58) Field of Classification Search
USPC ............... 382/100, 232; 380/27, 28, 37, 269, 380/200; 713/189, 193, 153
See application file for complete search history.

(56) References Cited

U.S. PATENT DOCUMENTS 7,409,094 B2 * 8/2008 Wee et al. ..................... 382/232
2002/0141648 A1 10/2002 Tanigawa
(Continued)

FOREIGN PATENT DOCUMENTS

EP 1 233 624 8/2002
JP 06-152989 5/1994
(Continued)

OTHER PUBLICATIONS

Japanese Office Action issued on Aug. 4, 2009, for corresponding Japanese Patent Application JP 2004-158325.
(Continued)

*Primary Examiner* — Brandon Hoffman
*Assistant Examiner* — Hee Song
(74) *Attorney, Agent, or Firm* — K&L Gates LLP

(57) ABSTRACT

An information processing system and a method for use therewith, an information processing apparatus and a method for use therewith, and a program which are capable of decrypting desired portions of encrypted data are provided. Of packets 211 through 216 constituting a bit stream of layered-encoded image data 201 according to JPEG 2000, the packets 211 through 213 are each encrypted independently of the packets 214 through 216 which are also encrypted each. This produces encrypted split data 262 with the resolution at level zero (corresponding to R0) and encrypted split data 263 with the resolution at level one (corresponding to R1). The header (ranging from SOC to SOD) of layered-encoded image data 201 is appropriated for a header 261, followed by encrypted split data 262 and 263 and an EOC 264, in that order, the whole data array constituting data 251 that is output as the definitive encrypted data. This invention is particularly applicable to image delivery apparatus.

12 Claims, 31 Drawing Sheets

(56) References Cited

U.S. PATENT DOCUMENTS

| | | | |
|---|---|---|---|
| 2002/0168112 A1 | 11/2002 | Schwartz et al. | |
| 2003/0068040 A1 | 4/2003 | Wee et al. | |
| 2003/0070081 A1* | 4/2003 | Wee et al. | 713/189 |
| 2004/0068587 A1* | 4/2004 | Le Leannec et al. | 709/247 |
| 2004/0081334 A1* | 4/2004 | Hayashi | 382/100 |
| 2004/0141613 A1* | 7/2004 | Hayashi | 380/28 |
| 2004/0153674 A1* | 8/2004 | Hayashi | 713/202 |
| 2005/0183118 A1* | 8/2005 | Wee et al. | 725/46 |

FOREIGN PATENT DOCUMENTS

| | | |
|---|---|---|
| JP | 8-331543 | 12/1996 |
| JP | 2000-013614 | 1/2000 |
| JP | 2000-13614 | 1/2000 |
| JP | 2001-258031 | 9/2001 |
| JP | 2002-300408 | 10/2002 |
| JP | 2002-359850 | 12/2002 |
| JP | 2003-153228 | 5/2003 |
| JP | 2003-324418 | 11/2003 |
| JP | 2004-140667 | 5/2004 |
| JP | 6-152989 | 11/2006 |
| WO | 02-17637 | 2/2002 |
| WO | 03/005636 A1 | 1/2003 |

OTHER PUBLICATIONS

JPEG 2000 Part I Final Committee Draft Version 1.0, ISO/IEC FCD15444-1: 2000 (V1.0, Mar. 16, 2000).

Japanese Office Action issued on Oct. 20, 2009, for corresponding Japanese Patent Application JP 2004-158325.

Anonymous, "JPEG 2000 Part I Final Committee Draft Version 1.0", ISO/IEC FCD15444-1, Mar. 16, 2000, pp. 13-52, XP002220239.

European Search Report dated Dec. 7, 2010, for corresponding European Patent Appln. No. 05727105.8.

* cited by examiner

F I G . 1 5

| PLM | Lplm | Zplm | Nplm i0 | Iplm ij | ... | Iplm fm) | ... |

| Nplm i0 | Iplm ij) | ... | Iplm fm) |

FIG. 17

| PLT | Lplt | Zplt | Iplt 0 | ... | Iplt 6) |

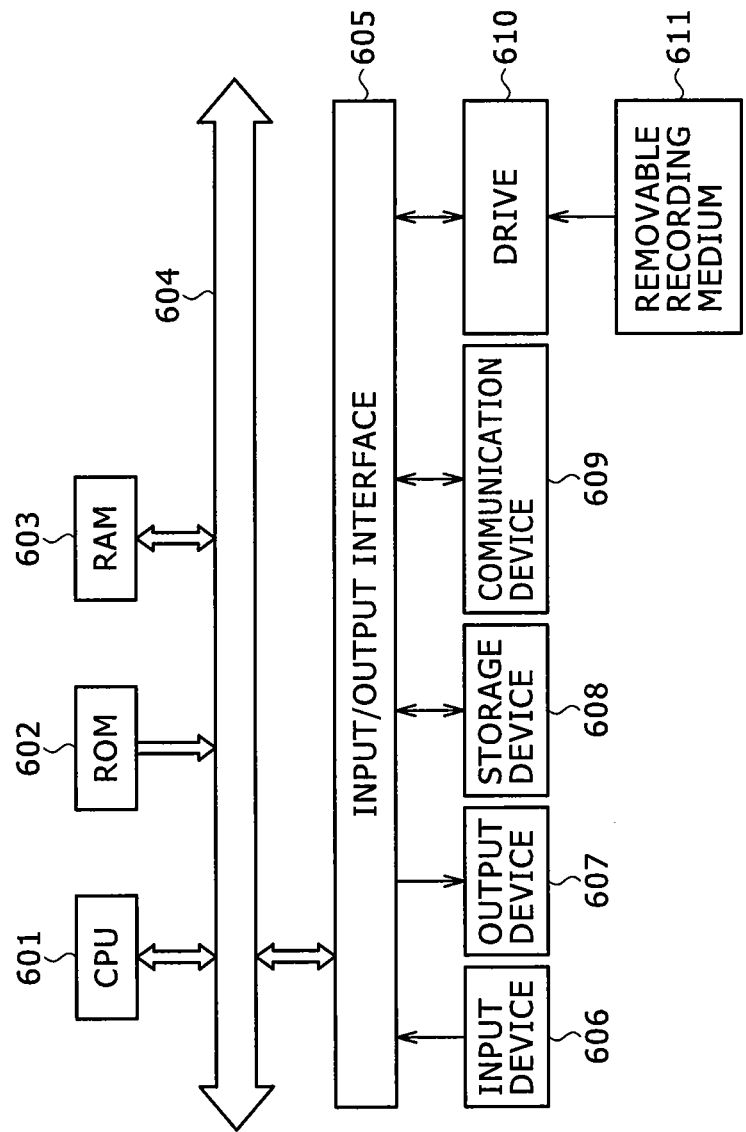

INFORMATION PROCESSING SYSTEM AND INFORMATION PROCESSING METHOD FOR USE THEREWITH, INFORMATION PROCESSING APPARATUS AND INFORMATION PROCESSING METHOD FOR USE THEREWITH, AND PROGRAM

CROSS REFERENCE TO RELATED APPLICATIONS

The present application claims priority to Japanese Patent Document No. 2004-158325 filed in Japan on May 27, 2004, the contents of which is herein incorporated by reference.

BACKGROUND

The present application relates to an information processing system and an information processing method for use therewith, an information processing apparatus and an information processing method for use therewith, and a program. More particularly, the invention relates to an information processing system and an information processing method for use therewith, an information processing apparatus and an information processing method for use therewith, and a program capable of extracting desired portions from encrypted data and decrypting the extracted portions.

BACKGROUND ART

One typical compression encoding standard well-known in recent years for allowing image data to be layered-encoded is JPEG (Joint Photographic Experts Group) 2000. This is a standard that permits handling of not only still image data but also moving image data.

When image data is layered-encoded according to a compression encoding standard such as JPEG 2000 (called layered-encoded image data hereunder), the layered structure of the layered-encoded data may be taken advantage of during the subsequent decoding of the data. The image data can be decoded with the spatial resolution of a given layer by using the layered structure of the layered-encoded data and the image data can be decoded with the bit rate of a given layer by using the layered structure of the layered-encoded data.

Where layered-encoded image data is distributed from a server to its clients over a network, it is necessary to protect the data. In that case, the server may encrypt the layered-encoded image data before delivering it to the clients. Typical encryption techniques that may be used for such encryption are disclosed illustratively in the following documents:
(Patent Document 1)
   PCT Patent Publication No. WO02/017637
(Patent Document 2)
   Japanese Patent Laid-open No. Hei 8-331543
(Patent Document 3)
   Japanese Patent Laid-open No. 2003-324418

In the description that follows, it is assumed that compression-encoded data is "decoded" as distinct from the case where encrypted data is "decrypted."

DISCLOSURE OF INVENTION

However, where layered-encoded image data is encrypted by techniques such as those disclosed in the above-cited Patent Documents 1, 2 and 3, a problem has been experienced: after encryption, it is very difficult to make use of the layered structure formed by the layered-encoded image data prior to the encryption. As a result, it is hard to extract and decrypt only those portions of the layered-encoded image data which correspond to a desired layer.

Where image data with the spatial resolution of a given layer or image data with the bit rate of a given layer is to be decoded, not all unencrypted layered-encoded image data needs to be used. Most often, only part of the data is necessary. However, as mentioned above, it is difficult to extract and decrypt only the desired portion from the encrypted layered-encoded image data. In the end, all encrypted layered-encoded image data must be decrypted.

In more generalized terms, where not only layered-encoded image data but other data is encrypted by traditional technique such as those disclosed in the above-cited patent documents, it is difficult to extract and decrypt part of the encrypted data. More specifically, when the image data constituting one still image is encrypted by a conventional technique (e.g., block coding such as AES (Advanced Encryption Standard)), the image as a whole is encrypted. It then becomes difficult to extract and decrypt that portion of the encrypted image data which corresponds to a given region of the still image (i.e., part of all space domain of the still image).

SUMMARY

The present invention has been made in view of the above circumstances and provides arrangements for extracting and decrypting a desired portion of encrypted data.

In carrying out the present invention and according to one embodiment thereof, there is provided an information processing system including a first and a second information processing apparatus, the first information processing apparatus encrypting at least part of input data and outputting the encrypted data as encrypted input data, the second information processing apparatus decrypting at least part of the encrypted input data. More specifically, the first information processing apparatus includes: splitting means for splitting the input data into a plurality of split data items in accordance with a predetermined rule; encrypting means for individually encrypting each of a predetermined number of the split data items furnished by the splitting means, before outputting each of the encrypted split data items; identification data creating means for creating identification data for individually identifying each of the encrypted split data items output by the encrypting means, the identification data identifies a position and a size of each of the encrypted split data items when the identification data, the encrypted split data items, and the unencrypted split data items yet to be encrypted by the encrypting means out of the plurality of split data items furnished by the splitting means are arrayed in a predetermined order; encrypted input data creating means for creating the encrypted input data as data constituted by the identification data created by the identification data creating means, the encrypted split data items output by the encrypting means, and the unencrypted split data items arrayed in the predetermined order; and delivering means for delivering the encrypted input data created by the encrypted input data creating means to the second information processing apparatus. The second information processing apparatus includes: extracting means for extracting part of all the encrypted split data items included in the encrypted input data, in accordance with the identification data included in the encrypted input data delivered by the delivering means of the first information processing apparatus; and decrypting means for decrypting the encrypted split data items extracted by the extracting means from the encrypted split data items included in the encrypted input data delivered by the delivering means of the first information processing apparatus.

According to another embodiment of the present invention, there is provided an information processing method for use with an information processing system including a first and a second information processing apparatus, the first information processing apparatus encrypting at least part of input data and outputting the encrypted data as encrypted input data, the second information processing apparatus decrypting at least part of the encrypted input data. More specifically, the information processing method includes the steps of causing the first information processing apparatus to: split the input data into a plurality of split data items in accordance with a predetermined rule; individually encrypt each of a predetermined number of the split data items furnished in the splitting step, before outputting each of the encrypted split data items; create identification data for individually identifying each of the encrypted split data items output in the encrypting step, the identification data identifies a position and a size of each of the encrypted split data items when the identification data, the encrypted split data items, and the unencrypted split data items yet to be encrypted in the encrypting step out of the plurality of split data items furnished in the splitting step are arrayed in a predetermined order; create the encrypted input data as data constituted by the identification data created in the identification data creating step, the encrypted split data items output in the encrypting step, and the unencrypted split data items arrayed in the predetermined order; and deliver the encrypted input data created in the encrypted input data creating step to the second information processing apparatus. The information processing method further includes the steps of causing the second information processing apparatus to: extract part of all the encrypted split data items included in the encrypted input data, in accordance with the identification data included in the encrypted input data delivered in the delivering step of the first information processing apparatus; and decrypt the encrypted split data items extracted in the extracting step from the encrypted split data items included in the encrypted input data delivered in the delivering step of the first information processing apparatus.

Where the information processing system and information processing method for use therewith outlined above are in use, at least part of input data is encrypted by the first information processing apparatus, and the resulting encrypted data is output as encrypted input data to the second information processing apparatus which decrypts at least part of the encrypted input data. More specifically, the first information processing apparatus performs a splitting process, an encrypting process, an identification data creating process, an encrypted input data creating process, and a delivering process. The splitting process involves splitting the input data into a plurality of split data items in accordance with a predetermined rule. The encrypting process involves individually encrypting each of a predetermined number of the split data items furnished by the splitting process, before outputting each of the encrypted split data items. The identification data creating process involves creating identification data for individually identifying each of the encrypted split data items output by the encrypting process, the identification data identifies a position and a size of each of the encrypted split data items when the identification data, the encrypted split data items, and the unencrypted split data items yet to be encrypted by the encrypting process out of the plurality of split data items furnished by the splitting process are arrayed in a predetermined order. The encrypted input data creating process involves creating the encrypted input data as data constituted by the identification data created by the identification data creating process, the encrypted split data items output by the encrypting process, and the unencrypted split data items arrayed in the predetermined order. The delivering process involves delivering the encrypted input data created by the encrypted input data creating process to the second information processing apparatus. The second information processing apparatus performs an extracting process extracting part of all the encrypted split data items included in the encrypted input data, in accordance with the identification data included in the encrypted input data delivered by the delivering process of the first information processing apparatus; and a decrypting process decrypting the encrypted split data items extracted by the extracting process from the encrypted split data items included in the encrypted input data delivered by the delivering process of the first information processing apparatus.

According to a further embodiment of the present invention, there is provided a first information processing apparatus for encrypting at least part of input data and outputting the encrypted data as encrypted input data, the first information processing apparatus including: splitting means for splitting the input data into a plurality of split data items in accordance with a predetermined rule; encrypting means for individually encrypting each of a predetermined number of the split data items furnished by the splitting means, before outputting each of the encrypted split data items; identification data creating means for creating identification data for individually identifying each of the encrypted split data items output by the encrypting means, the identification data identifies a position and a size of each of the encrypted split data items when the identification data, the encrypted split data items, and the unencrypted split data items yet to be encrypted by the encrypting means out of the plurality of split data items furnished by the splitting means are arrayed in a predetermined order; and encrypted input data creating means for creating the encrypted input data as data constituted by the identification data created by the identification data creating means, the encrypted split data items output by the encrypting means, and the unencrypted split data items arrayed in the predetermined order.

Preferably, the input data may be input to the information processing apparatus as layered-encoded image data acquired by having given image data layered-encoded in accordance with a predetermined layered-encoding standard; and the splitting means may split the input layered-encoded image data into layer-by-layer encoded data items constituting the split data items.

Preferably, if the predetermined layered-encoding standard is JPEG 2000, the identification data creating means may acquire a header of the layered-encoded image data including any of SIZ (image and tile size), COD (coding style default), PLM (packet length, main header), and PLT (packet length, tile-part header) so as to appropriate the header for the identification data instead of creating the identification data anew; and the encrypted input data creating means may create as the encrypted input data an array of the unencrypted split data items including the header of the layered-encoded image data appropriated by the identification data creating means for the identification data, and of the encrypted split data items, in keeping with an array sequence of packets making up the layered-encoded image data.

According to an even further embodiment of the present invention, there is provided a first information processing method for use with a first information processing apparatus for encrypting at least part of input data and outputting the encrypted data as encrypted input data, the first information processing method including the steps of: splitting the input data into a plurality of split data items in accordance with a predetermined rule; individually encrypting each of a predetermined number of the split data items furnished in the splitting step, before outputting each of the encrypted split data items; creating identification data for individually identifying each of the encrypted split data items output in the encrypting step, the identification data identifies a position and a size of each of the encrypted split data items when the identification data, the encrypted split data items, and the unencrypted split data items yet to be encrypted in the encrypting step out of the plurality of split data items furnished in the splitting step are arrayed in a predetermined order; and creating the encrypted input data as data constituted by the identification data created in the identification data creating step, the encrypted split data items output in the encrypting step, and the unencrypted split data items arrayed in the predetermined order.

According to a still further embodiment of the present invention, there is provided a first program for causing a computer to execute a procedure for encrypting at least part of input data and outputting the encrypted data as encrypted input data, the procedure including the steps of: splitting the input data into a plurality of split data items in accordance with a predetermined rule; individually encrypting each of a predetermined number of the split data items furnished in the splitting step, before outputting each of the encrypted split data items; creating identification data for individually identifying each of the encrypted split data items output in the encrypting step, the identification data identifies a position and a size of each of the encrypted split data items when the identification data, the encrypted split data items, and the unencrypted split data items yet to be encrypted in the encrypting step out of the plurality of split data items furnished in the splitting step are arrayed in a predetermined order; and creating the encrypted input data as data constituted by the identification data created in the identification data creating step, the encrypted split data items output in the encrypting step, and the unencrypted split data items arrayed in the predetermined order.

Where the first information processing apparatus, the first information processing method for use therewith, and the first program outlined above are in use, at least part of input data is encrypted and the resulting encrypted data is output as encrypted input data. More specifically, the input data is split into a plurality of split data items in accordance with a predetermined rule; each of a predetermined number of the split data items is individually encrypted; and each of the encrypted split data items is output. Then identification data is created for individually identifying each of the encrypted split data items, the identification data identifies a position and a size of each of the encrypted split data items when the identification data, the encrypted split data items, and the unencrypted split data items yet to be encrypted in the encrypting step out of the plurality of split data items furnished in the splitting step are arrayed in a predetermined order. The encrypted input data is output as data constituted by the identification data, encrypted split data items, and unencrypted split data items arrayed in the predetermined order.

According to a yet further embodiment of the present invention, there is provided a second information processing apparatus for use when given data is split into a plurality of split data items in accordance with a predetermined rule; each of a predetermined number of the split data items is individually encrypted so as to output each of the encrypted split data items; identification data is created for individually identifying each of the encrypted split data items, the data creation being performed in such a manner that the identification data identifies a position and a size of each of the encrypted split data items when the identification data, the encrypted split data items, and the unencrypted split data items yet to be encrypted out of the plurality of split data items are arrayed in a predetermined order; the encrypted input data is created as data constituted by the identification data, the encrypted split data items, and the unencrypted split data items arrayed in the predetermined order; and the encrypted input data is delivered to the second information processing apparatus which decrypts at least part of the encrypted input data. More specifically, the second information processing apparatus includes: extracting means for extracting part of all the encrypted split data items included in the encrypted input data, in accordance with the identification data included in the encrypted input data; and decrypting means for decrypting the encrypted split data items extracted by the extracting means from the encrypted split data items included in the encrypted input data.

Preferably, the given data may be input as layered-encoded image data acquired by having given image data layered-encoded in accordance with a predetermined layered-encoding standard, the layered-encoded image data being split into layer-by-layer encoded data items constituting the split data items which are delivered to the second information processing apparatus as the encrypted input data; the second information processing apparatus further including layer designating means for designating the layer from which to reproduce the given image data; wherein, based on the identification data included in the encrypted input data, the extracting means may extract the encrypted split data items corresponding to the layer designated by the layer designating means out of all the encrypted split data items included in the encrypted input data.

Preferably, if the predetermined layered-encoding standard is JPEG 2000, if a header of the layered-encoded image data is appropriated for the identification data, and if the unencrypted split data items including the header and the encrypted split data items are arrayed in keeping with an array sequence of packets making up the layered-encoded image data, the resulting data array being delivered as the encrypted input data; then, based on any of SIZ (image and tile size), COD (coding style default), PLM (packet length, main header) and PLT (packet length, tile-part header), the extracting means may extract the encrypted split data items corresponding to the layer designated by the layer designating means out of all the encrypted split data items included in the encrypted input data.

According to another embodiment of the present invention, there is provided a second information processing method for use with a second information processing apparatus when given data is split into a plurality of split data items in accordance with a predetermined rule; each of a predetermined number of the split data items is individually encrypted so as to output each of the encrypted split data items; identification data is created for individually identifying each of the encrypted split data items, the data creation being performed in such a manner that the identification data identifies a position and a size of each of the encrypted split data items when the identification data, the encrypted split data items, and the unencrypted split data items yet to be encrypted out of the plurality of split data items are arrayed in a predetermined order; the encrypted input data is created as data constituted by the identification data, the encrypted split data items, and the unencrypted split data items arrayed in the predetermined order; and the encrypted input data is delivered to the second information processing apparatus which decrypts at least part of the encrypted input data. More specifically, the second information processing method includes the steps of: extracting part of all the encrypted split data items included in the encrypted input data, in accordance with the identification data included in the encrypted input data; and decrypting the encrypted split data items extracted in the extracting step from the encrypted split data items included in the encrypted input data.

According to a further embodiment of the present invention, there is provided a second program for causing a computer to control a procedure when given data is split into a plurality of split data items in accordance with a predetermined rule; each of a predetermined number of the split data items is individually encrypted so as to output each of the encrypted split data items; identification data is created for individually identifying each of the encrypted split data items, the data creation being performed in such a manner that the identification data identifies a position and a size of each of the encrypted split data items when the identification data, the encrypted split data items, and the unencrypted split data items yet to be encrypted out of the plurality of split data items are arrayed in a predetermined order; the encrypted input data is created as data constituted by the identification data, the encrypted split data items, and the unencrypted split data items arrayed in the predetermined order; and the encrypted input data is delivered to the procedure which decrypts at least part of the encrypted input data. More specifically, the second program causes the computer to execute the procedure including the steps of: extracting part of all the encrypted split data items included in the encrypted input data, in accordance with the identification data included in the encrypted input data; and decrypting the encrypted split data items extracted in the extracting step from the encrypted split data items included in the encrypted input data.

Where the second information processing apparatus, the second information processing method for use therewith, and the second program outlined above are in use, it is assumed that given data is split into a plurality of split data items in accordance with a predetermined rule; each of a predetermined number of the split data items is individually encrypted so as to output each of the encrypted split data items; identification data is created for individually identifying each of the encrypted split data items, the data creation being performed in such a manner that the identification data identifies a position and a size of each of the encrypted split data items when the identification data, the encrypted split data items, and the unencrypted split data items yet to be encrypted out of the plurality of split data items are arrayed in a predetermined order; the encrypted input data is created as data constituted by the identification data, the encrypted split data items, and the unencrypted split data items arrayed in the predetermined order; and the encrypted input data is delivered. On that assumption, at least part of the encrypted input data is decrypted. More specifically, part of all the encrypted split data items included in the encrypted input data is extracted in accordance with the identification data included in the encrypted input data; and the encrypted split data items extracted from the encrypted split data items included in the encrypted input data is decrypted.

According to the present invention, as outlined above, given data is encrypted and a desired part of the encrypted data is extracted and decrypted. It is also possible to perform an encrypting process that allows that kind of decryption to be carried out.

Additional features and advantages of the present invention are described in, and will be apparent from, the following Detailed Description and the Figures.

BRIEF DESCRIPTION OF THE FIGURES

FIG. 15 is a schematic view showing a detailed structure of PLM included in FIG. 14;

FIG. 17 is a schematic view showing a detailed structure of PLT included in FIG. 14;

FIG. 31 is a block diagram showing a hardware structure of the information processing apparatus according to the present invention.

DETAILED DESCRIPTION

Preferred embodiments of the present invention will now be described with reference to the accompanying drawings.

The present invention may be applied to diverse kinds of information processing apparatuses and information processing systems. In other words, this invention will take many forms when embodied. One of such embodiments will be described below by referring to FIGS. 1 through 28. Some other embodiments will then be discussed in reference to FIGS. 29 through 31.

Figure 1:
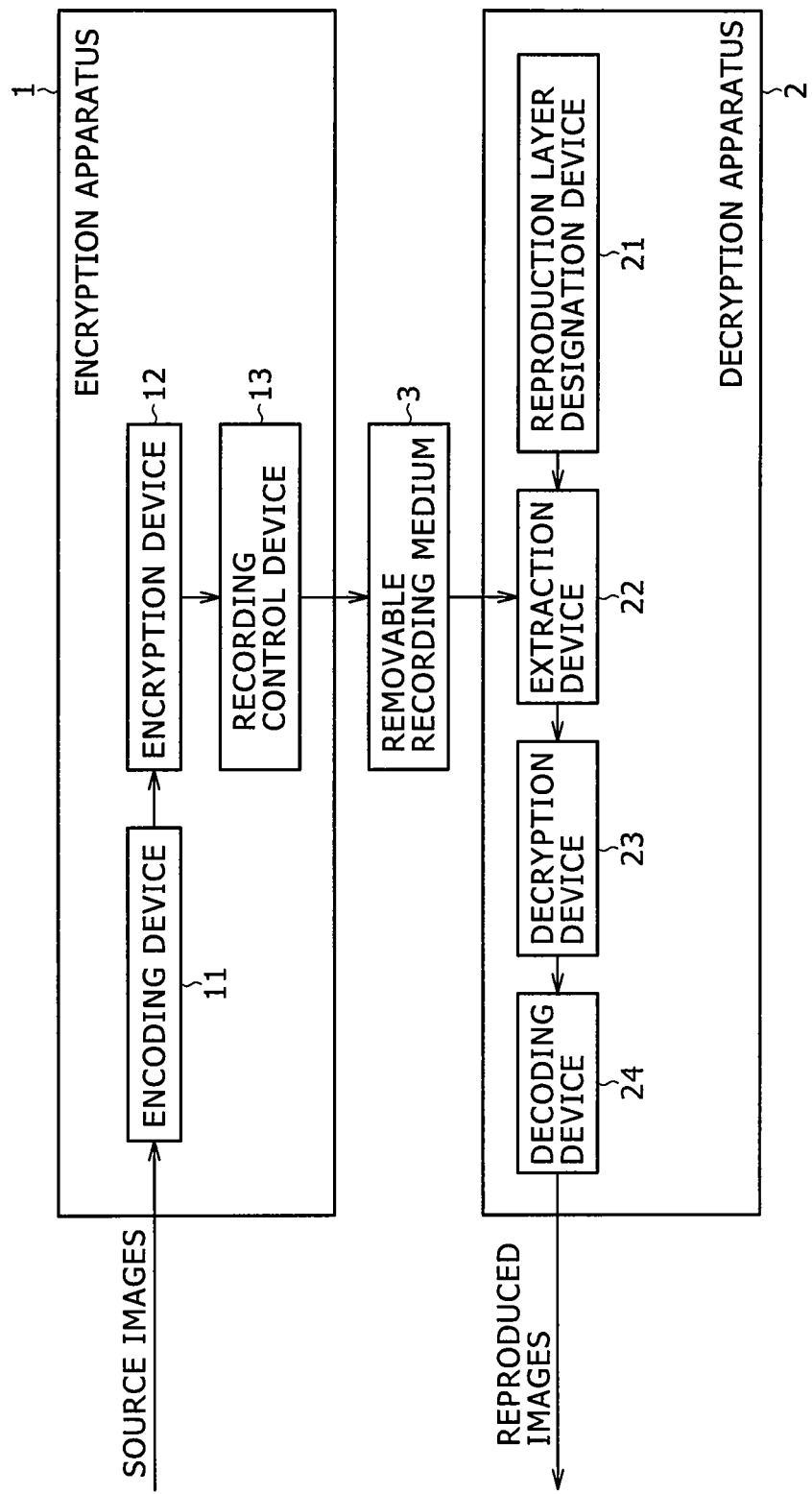
FIG. 1 is a block diagram showing a functional structure of an information processing system according to the present invention.

FIG. 1 is a block diagram showing a functional structure of an information processing system according to the present invention.

As shown in FIG. 1, this information processing system is made up of an encryption apparatus 1 and a decryption apparatus 2.

The encryption apparatus 1 is capable of encoding (i.e., layered-encoding) source images, encrypting the layered-encoded source images, and recording the encrypted images to a removable recording medium 3.

It should be noted here that the data output by the encryption apparatus 1, i.e., layered-encoded and encrypted source images (called the encrypted source image data hereunder) is left unmodified and that only a necessary data part to be reproduced (decoded) from a desired layer is extracted and decrypted. More details and examples of the encrypted source image data will be described later.

To be more precise, source images input to the encryption apparatus 1 refer to analog or digital image signals (data) representative of the source images. The source images may be moving images (image signals) or still images (picture signals).

In this manner, at least one item of encrypted source image data is recorded to the removable recording medium 3.

The decryption apparatus 2 acquires one item of encrypted source image data from the removable recording medium 3, decodes the acquired data item, and outputs the resulting image signal as a reproduced image.

It should be noted here that the decryption apparatus 2 does not necessarily decrypt all encrypted source image data from the removable recording medium 3; only a necessary portion to be reproduced (decoded) from a desired layer is extracted and decrypted. In other words, when a source image is to be reproduced (decoded) from a given layer representing a given type of quality (i.e., a layer lower than the highest layer intrinsic in the source image), the decryption apparatus 1 decrypts only the necessary portion of the encrypted source image data and does not decrypt all encrypted source image data.

If source images or reproduced images are moving images, the encryption apparatus 1 and decryption apparatus 2 may handle the images in units of frames or fields. Such frames or fields are called the access unit each. A frame represents each of the still images making up a moving image. The encryption apparatus 1 and decryption apparatus 2 can repeatedly perform any one of diverse processes on each of the still images (i.e., frames) constituting a moving image. In the ensuing description, processes are assumed to be carried out on a single still image. In other words, it is assumed that the source image and the reproduced image are a single still image (image signal) each.

Typical functional structures of the encryption apparatus 1 and decryption apparatus 2 will now be described. The encryption apparatus 1 will be discussed first.

The encryption apparatus 1 includes an encoding device 11, an encryption device 12, and a recording control device 13.

The encoding device 11 layer-encodes the source image (still image) in order of quality type according to a predetermined layered-encoding standard. The resulting layered-encoded image data is supplied to the encryption apparatus 12.

The layered-encoding standard used by the encoding device 11 is illustratively JPEG 2000 but is not limited thereto. Under JPEG 2000, the types of quality typically include spatial resolution, SNR (signal to noise ratio) image quality (simply called image quality hereunder), position (space domain), and components. Other aspects of JPEG 2000 will be explained later in detail with reference to FIGS. 2 through 6.

The encryption device 12 splits the layered-encoded image data coming from the encoding device 11 into layer-by-layer encoded data items. Each of the split encoded data items on each layer (level) is individually encrypted using a predetermined encryption technique (encryption algorithm). The data items thus encrypted on a layer-by-layer basis are each called the encrypted split data item on each layer.

In this description, the process of splitting refers not only to actually splitting data into data items (i.e., extracting data items) but also to creating information for identifying delimiters (cutoff points) of data during a subsequent process. In the description that follows, the splitting process is assumed to involve actually splitting data (e.g., into layer-by-layer encrypted split data items) for purpose of simplification and illustration.

The encryption algorithm for use by the encryption device 12 may derive from any suitable encryption standard. Specific algorithms that may be utilized by the encryption device 12 will be described later with reference to FIGS. 7 through 11.

The encryption device 12 further arrays layer-by-layer encrypted split data items into a predetermined order, and supplements the data array with particular data (called identification data) for identifying positions and sizes of the encrypted split data items on each layer, i.e., data for allowing the layer-by-layer encrypted split data items to be extracted individually when decrypted. The resulting data is supplied to the recording control device 13 as encrypted source image data.

The identification data, as defined above, may be of any type as long as it can identify the array position and size of each of the encrypted split data items on each layer. In other words, the identification data may be any data that allows the layer-by-layer encrypted split data items to be extracted individually when decrypted.

With this embodiment, layered-encoded image data under JPEG 2000 (as will be discussed later) is forwarded from the encoding device 11 to the encryption device 12. In this case, the headers for the layered-encoded image data may each be utilized as identification data. That is because each of these headers includes SIZ, COD, PLM, and PLT shown in FIGS. 14 through 17. These elements will be discussed later by referring to the relevant drawings.

That is, what may be utilized as encrypted source image data by this embodiment is as follows: the header of layered-encoded image data under JPEG 2000 (i.e., for unencrypted data) may be appropriated for identification data. The header and layer-by-layer encrypted split data items may be arrayed in accordance with a sequence of packets (to be explained later) constituting unencrypted layered-encoded image data. The data array may then be utilized as the encrypted source image data.

The foregoing has been an overview of the processing performed by the encryption device 12. More detailed explanations of the processing (specific examples, etc.) will be made later with reference to FIGS. 12 through 22. A detailed functional structure of the encryption device 12 will also be discussed later by referring to FIG. 23.

The recording control device 13 records to the removable recording medium 3 the encrypted source image data supplied from the encryption device 12.

The typical functional structure of the encryption device 1 has been described above. What follows is a description of a typical functional structure of the decryption device 2.

The decryption device 2 includes a reproduction layer designation device 21, an extraction device 22, a decryption device 23, and a decoding device 24.

The reproduction layer designation device 21 designates the layer representing a specific type of quality (called the reproduction layer) when a source image corresponding to the encrypted source image data recorded on the removable recording medium 3 is to be reproduced, and notifies the extraction device 22 of the designated layer. At this point, the reproduction layer designation device 21 may designate the reproduction layer either as instructed by the user (i.e., according to an instruction entered through a user interface, not shown) or automatically at its own discretion.

Out of the encrypted source image data recorded on the removable recording medium 3, the extraction device 22 may extract only the data portion necessary for image reproduction on the reproduction layer designated by the reproduction layer designation device 21, and supply the extracted data portion to the decryption device 23. At this point, the extraction device 22 utilizes the above-mentioned identification data included in the encrypted source image data recorded on the removable recording medium 3 when identifying the data portion to be extracted. Illustratively, the extraction device 22 may resort to the JPEG 2000-based header appropriated for the identification data (using SIZ, COD, PLM and/or PLT, to be more precise, as will be discussed later) for identifying and extracting the relevant data portion.

The decryption device 23 decrypts the data portion extracted by the extraction device 22 from the encrypted source image data recorded on the removable recording medium 3. The resulting decrypted data (called the encoded data in the reproduction layer) is supplied to the decoding device 24.

To be more precise, the encoded data in the reproduction layer is not the decrypted data itself but the data obtained by executing diverse processes (e.g., see step S66 in FIG. 27 and step S48 in FIG. 26) on the decrypted data.

The decoding device 24 decodes the encoded data in the reproduction layer coming from the decryption device 23, and outputs the resulting image signal (i.e., source image reconstructed on the reproduction layer representing the desired type of quality) as the reproduced image.

As described above, the encryption apparatus 1 is capable of encrypting layered-encoded image data. In particular, the encryption apparatus 1 is structured so as to leave unmodified the layered-encoded image data encrypted by the encryption device 1 itself (i.e., encrypted source image data) when extracting only the data portion to be needed in a subsequent process (e.g., needed by the decryption device 23 of the decryption apparatus 2 in the example of FIG. 1). This structure eliminates the need for the decryption apparatus 2 to decrypt all encrypted source image data; the decryption apparatus 2 needs only decrypt the data portion that may be reproduced (decoded) on the reproduction layer designated by the reproduction layer designation device21. This is a feature that resolves the above-mentioned major problem experienced in this technical field.

Described below with reference to FIGS. 2 through 6 is the layered structure (scalability) under JPEG 2000 for use by the encoding device 11 of this embodiment.

Under JPEG 2000, a single unit of compression-encoded image data is called a packet. This term will be adopted throughout the ensuing description.

The process of image reproduction according to JPEG 2000 typically proceeds as follows: out of layered-encoded image data (all data including the header), a bit stream constituting actual data (i.e., data corresponding to an image) is decoded sequentially from the beginning and reproduced successively. When the progression order of packets is varied depending on the selected type of quality, it is possible to control various types of quality upon image reproduction (e.g., for reproduction on the desired layer). To repeat the foregoing description, the types of quality under JPEG 2000 typically include image quality, spatial resolution, position (space domain), and components.

The scalability of spatial resolution will now be described by referring to FIG. 2.

Figure 2:
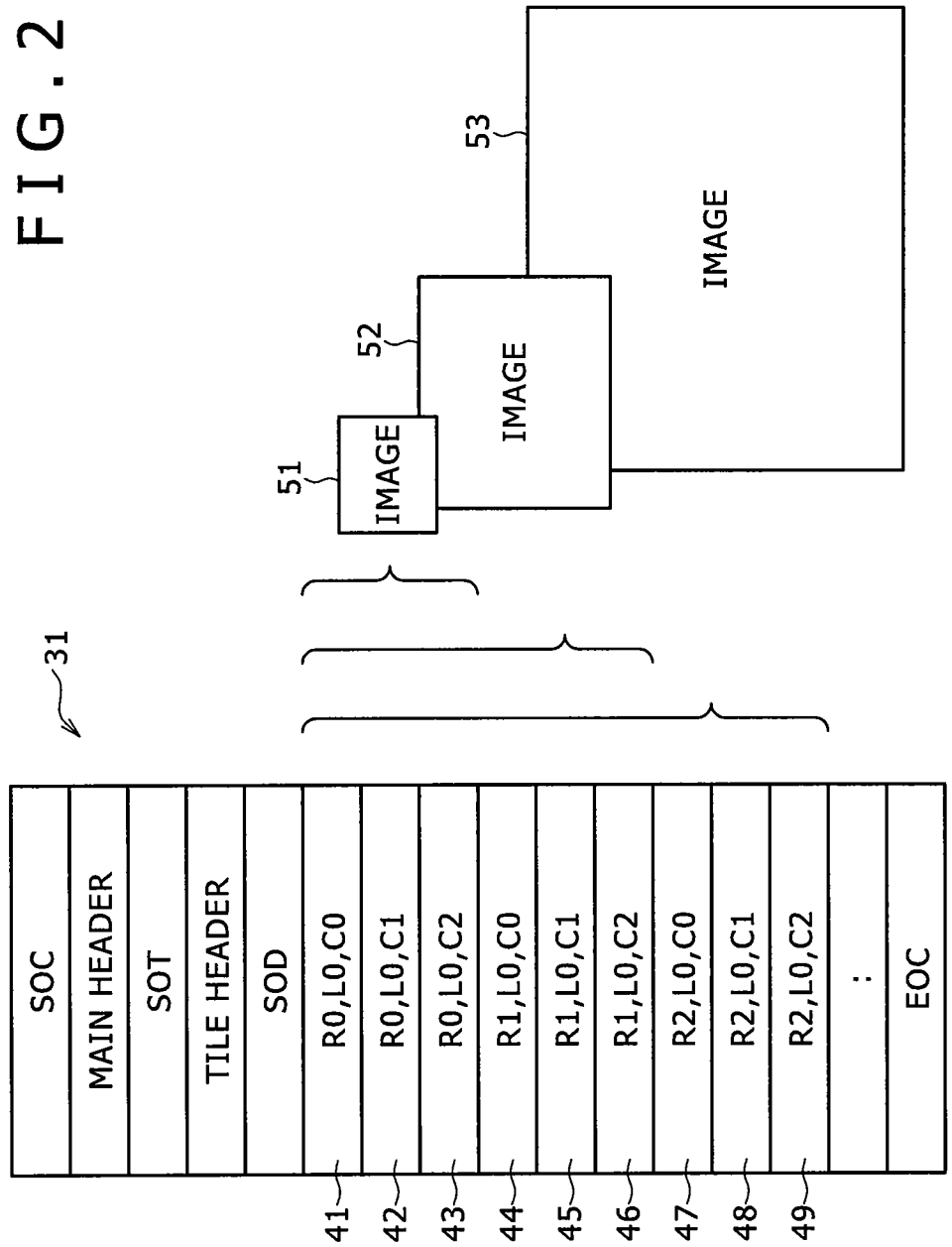
FIG. 2 is a schematic view explanatory of the encoding standard JPEG 2000 for use by an encoding device included in FIG. 1.

FIG. 2 schematically shows layered-encoded image data 31 formed by packets that are arranged in order of spatial resolution. The layered-encoded image data 31 is provided in a packet progression such as to improve spatial resolution step by step. This packet progression is effective where all image components on low spatial resolution levels are needed.

In the layered-encoded image data 31 of FIG. 2, each rectangular box (box-shaped frame) represents a single packet.

As shown in FIG. 2, the first packet is SOC (start of code stream), a marker that is attached to the beginning of the progression. SOC is followed by a main header of which details will be discussed later in reference to FIG. 14. The main header is followed by a packet SOT (start of tile-part). SOT is the marker always placed ahead of a tile header that follows. Details of the tile header will be described later by referring to FIG. 16. The tile header is followed by a packet SOD (start of data), a marker indicating that a bit stream according to JPEG 2000 follows.

The above group of the packets SOC through SOD is simply called the header. The header is followed by a JPEG 2000-based bit stream. As mentioned above, the bit stream is formed by compression-encoded data constituting the source image, the data being split into packets. At the end of the bit stream always comes a packet called EOC (end of code stream).

In the example of FIG. 2, only packets 41 through 49 of the bit stream are shown.

Each of the packets 41 through 49 describes a quality type and a layer (level) from left to right in order of priority. The quality types described here include R, L, and C. The types R, L and C are each assigned a numerical value (0, 1 or 2 in the example of FIG. 2) indicating the layer of the corresponding packet. More specifically, R stands for resolution (spatial resolution), L for quality (layer), and C for component. Although the component C is followed by a position in practice, the description of positions is omitted from the example of FIG. 2. Illustratively, R0 indicates that the layer of spatial resolution is level zero. This scalability scheme is called RLCP spatial resolution scalability in terms of quality. The above explanation applies as well to FIGS. 3 through 6, FIGS. 12 and 13, and FIGS. 18 through 22, to be described later.

Under the RLCP spatial resolution scalability scheme, an image 51 with the lowest spatial resolution (layer: level zero) is reproduced from all packets 41 through 43 applicable to R0. That is, decoding the packets 41 through 43 provides the image 51. An image 52 with the next spatial resolution (layer: level one) is reproduced from all packets applicable to R1 and R0. An image 53 with the next spatial resolution (layer: level two) is reproduced from all packets 41 through 49 applicable to R0 through R2. In this manner, images with progressively higher spatial resolutions are reproduced (not shown).

Image quality scalability will now be described with reference to FIG. 3.

Figure 3:
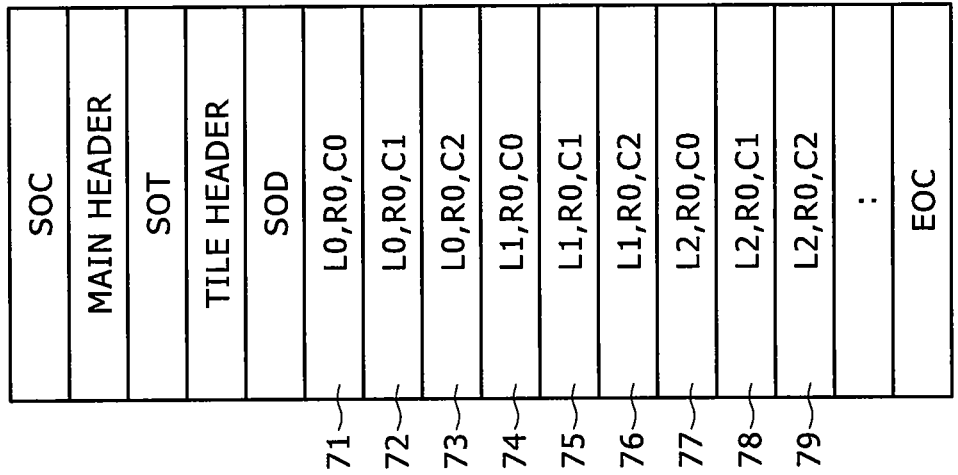
FIG. 3 is another schematic view explanatory of the encoding standard JPEG 2000 for use by the encoding device in FIG. 1.

FIG. 3 schematically shows layered-encoded image data 61 formed by packets that are arranged in order of image quality. The layered-encoded image data 61 is provided in a packet progression such as to improve image quality step by step. This packet progression is effective where all component information is initially needed for all spatial resolution levels even though image quality is low.

In the layered-encoded image data 61 of FIG. 3, the same header as that in FIG. 2 (ranging from SOC to SOD) is followed by a bit stream. In the example of FIG. 3, only packets 71 through 79 out of the packets constituting this bit stream are shown.

In terms of image quality scalability, each of the packets constituting the bit stream describes L, R, C and P (P not shown) from left to right in order of priority, as can be seen from the descriptions in the packets 71 through 79. In that sense, this image quality scalability scheme may be called LRCP image quality scalability.

Under the LRCP image quality scalability scheme, an image 81 with the lowest image quality (layer: level zero) is reproduced from all packets 71 through 73 applicable to L0. That is, decoding the packets 71 through 73 provides the image 81. An image 82 with the next image quality (layer: level one) is reproduced from all packets 71 through 76 applicable to L0 and L1. An image 83 with the next image quality (layer: level two) is reproduced from all packets 71 through 79 applicable to levels L0 through L2. In this manner, images at progressively higher image quality levels are reproduced (not shown).

Another type of spatial resolution scalability (different from what is shown in FIG. 2) will now be described by referring to FIG. 4.

Figure 4:
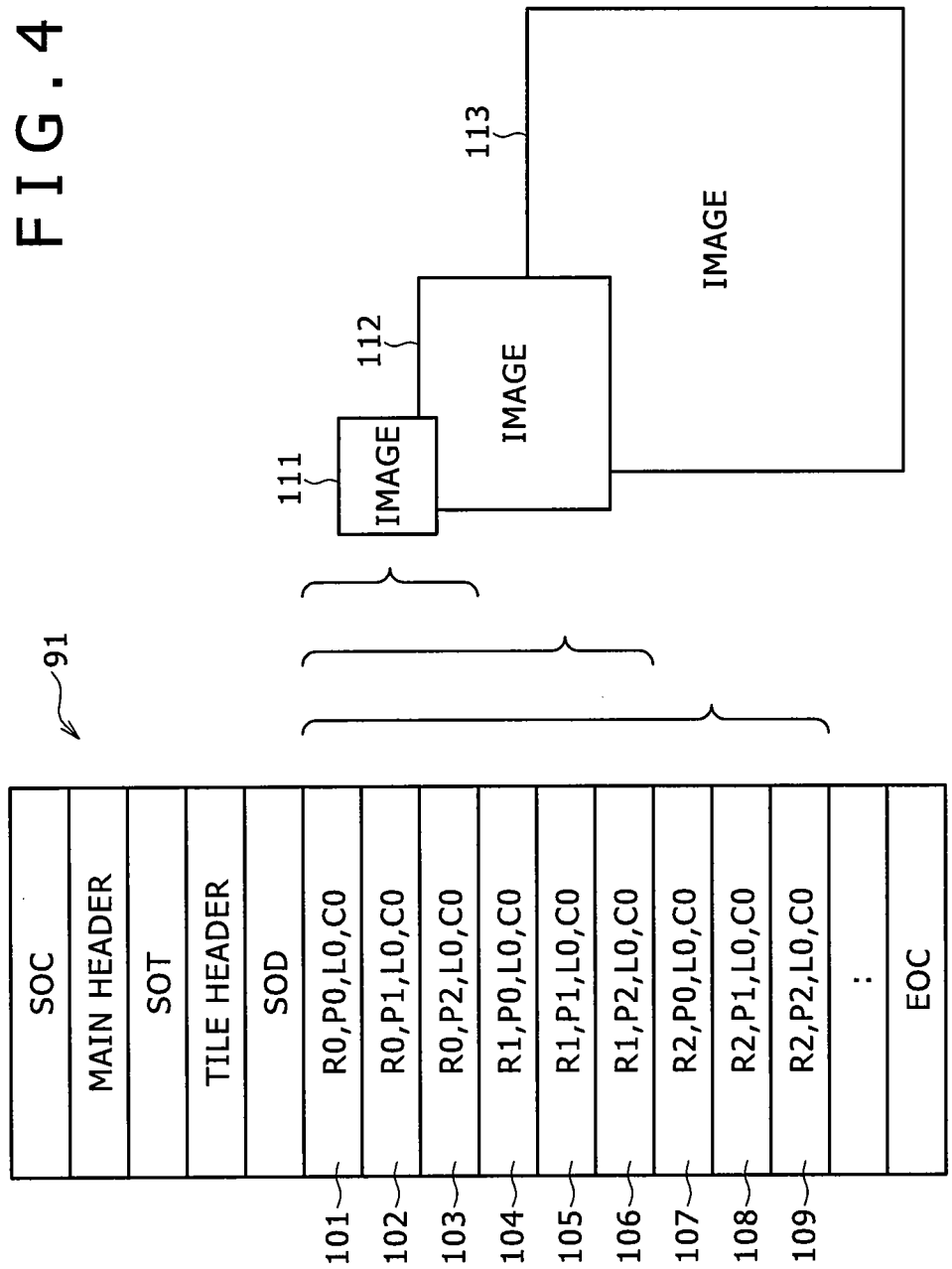
FIG. 4 is another schematic view explanatory of the encoding standard JPEG 2000 for use by the encoding device in FIG. 1.

FIG. 4 schematically shows layered-encoded image data 91 formed by packets that are arranged in order of spatial resolution. Whereas the layered-encoded image data 31 in FIG. 2 comes under the RLCP spatial resolution scalability scheme, the layered-encoded image data 91 in FIG. 4 is pursuant to RPLC spatial resolution scalability as can be seen from the descriptions (i.e., their order) of packets 101 through 109. This type of layered-encoded image data 91 (i.e., its packet progression) is effective where the low spatial resolution levels of all components are initially needed for a particular position in space.

In the layered-encoded image data 91 of FIG. 4, the same header as that in FIG. 2 (ranging from SOC to SOD) is followed by a bit stream. In the example of FIG. 4, only packets 101 through 109 out of the packets constituting this bit stream are shown. In the packets 101 through 109, reference character P stands for positions.

Under the RPLC spatial resolution scalability scheme, an image 111 with the lowest spatial resolution (layer: level zero) is reproduced from all packets 101 through 103 applicable to R0. That is, decoding the packets 101 through 103 provides the image 111. An image 112 with the next spatial resolution (layer: level one) is reproduced from all packets 101 through 106 applicable to R0 and R1. An image 113 with the next spatial resolution (layer: level two) is reproduced from all packets 101 through 109 applicable to R0 through R2. In this manner, images with progressively higher spatial resolutions are reproduced (not shown).

Position scalability will now be described with reference to FIG. 5.

Figure 5:
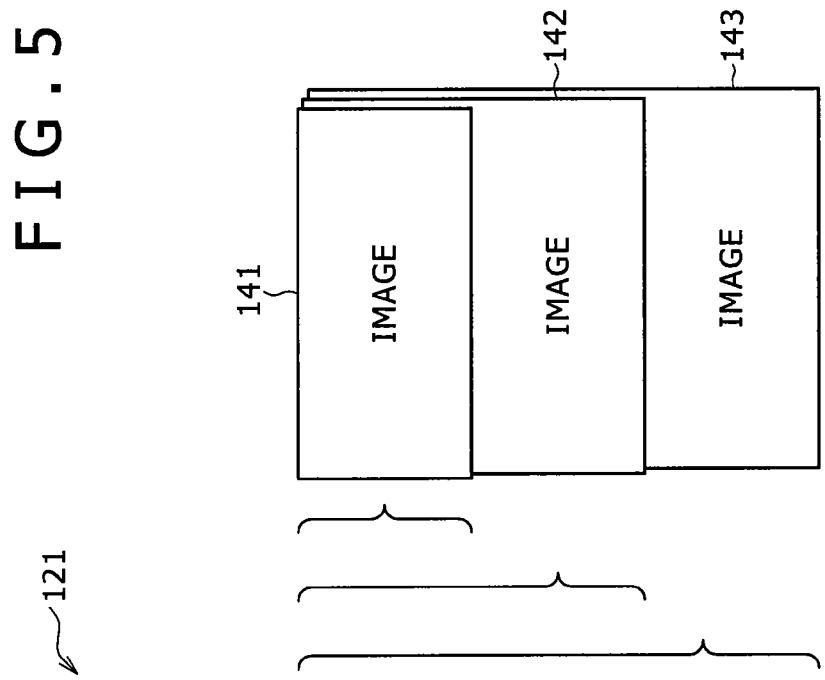
FIG. 5 is another schematic view explanatory of the encoding standard JPEG 2000 for use by the encoding device in FIG. 1.

FIG. 5 schematically shows layered-encoded image data 121 formed by packets that are arranged in order of position. The layered-encoded image data 121 is provided in a packet progression such as to improve spatial positions step by step. This packet progression is effective where high sampling accuracy is to be given to a particular spatial position in all components.

In the layered-encoded image data 121 of FIG. 5, the same header as that in FIG. 2 (ranging from SOC to SOD) is followed by a bit stream. In the example of FIG. 5, only packets 131 through 139 out of the packets constituting this bit stream are shown.

In terms of position scalability, each of the packets constituting the bit stream describes P, C, R and L from left to right in order of priority, as can be seen from the descriptions in the packets 131 through 139. In that sense, this position scalability scheme may be called PCRL position scalability.

For example, if the source image is split into N (any integer) blocks (regions) at predetermined intervals from the top down in space, there will be position layers zero through N-1. That is, each of the position layers is representative of a given number of target blocks to be reproduced out of the entire source image.

Thus reproduction from the position layer at level zero signifies that the first block from the top is reproduced out of the source image. The first block on top is indicated as an image 141. The image 141 with the position layer at level zero is reproduced from all packets 131 through 133 applicable to P0. That is, decoding the packets 131 through 133 provides the image 141.

Likewise, reproduction from the position layer at level one signifies that a region made up of the first and the second blocks from the top is reproduced. The region composed of the first and the second blocks is shown as an image 142. The image 142 with the position layer at level one is reproduced from all packets 131 through 136 applicable to P0 and P1.

Reproduction from the position layer at level two signifies that a region made up of the first through the third blocks from the top is reproduced. The region composed of the first through the third blocks from the top is shown as an image 143. The image 143 with the position layer at level two is reproduced from all packets 131 through 139 applicable to P0 through P2.

In this manner, regions (images) made up of ever-larger numbers of blocks are reproduced.

Lastly, component scalability will be described with reference to FIG. 6.

Figure 6:
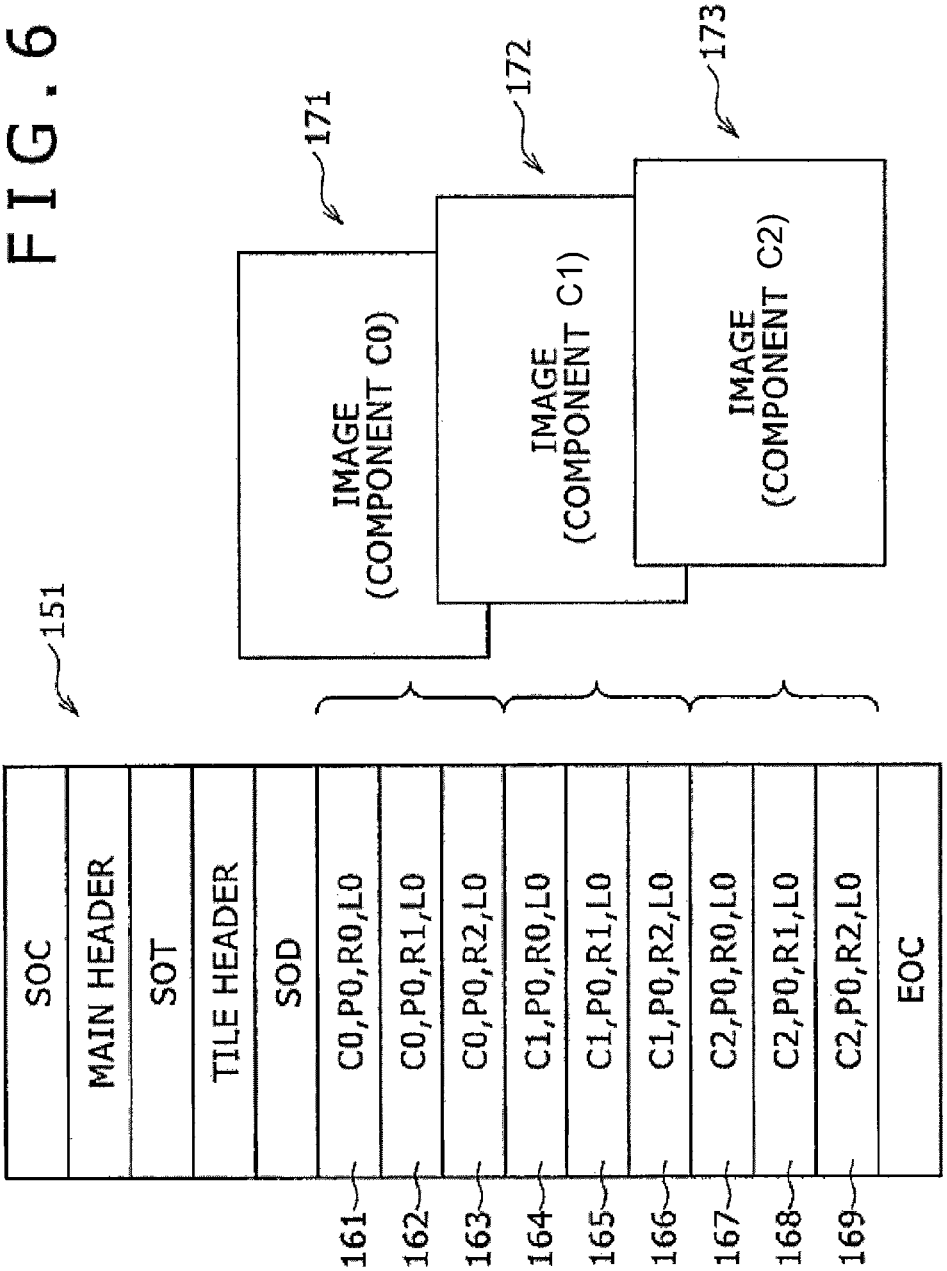
FIG. 6 is another schematic view explanatory of the encoding standard JPEG 2000 for use by the encoding device in FIG. 1.

FIG. 6 schematically shows layered-encoded image data 151 formed by packets that are arranged in order of component. The layered-encoded image data 151 is provided in a packet progression such as to improve quality with components step by step. This packet progression is effective where high accuracy is to be given to a particular spatial position within a particular image component.

In the layered-encoded image data 151 of FIG. 6, the same header as that in FIG. 2 (ranging from SOC to SOD) is followed by a bit stream. In the example of FIG. 6, only packets 161 through 169 out of the packets constituting this bit stream are shown.

In terms of component scalability, each of the packets constituting the bit stream describes C, P, R and L from left to right in order of priority, as can be seen from the descriptions in the packets 161 through 169. In that sense, this component scalability scheme may be called CPRL component scalability.

Under the CPRL component scalability scheme, component layers are defined as follows: illustratively, if each of M (any integer) components is assigned one of numbers zero through M-1 according to a predetermined rule (e.g., a rule according to which gray components are to be first reproduced followed by color components), then the numbers zero through M-1 represent the component layers.

Thus reproduction from the component layer at level zero signifies that an image is reproduced with the component numbered zero. The image reproduced with the component numbered zero may be considered an image on the component layer of level zero (corresponding to C0). This is an image 171 in the example of FIG. 6. The image171 with the component layer at level zero is reproduced from all packets 161 through 163 applicable to C0. That is, decoding the packets 161 through 163 provides the image 171.

Likewise, reproduction from the component layer at level one signifies that an image is reproduced with the component numbered one. The image reproduced with the component numbered one may be considered an image on the component layer of level one (corresponding to C1). This is an image 172 in the example of FIG. 6. The image172 on the component layer of level one is reproduced from all packets 164 through 166 applicable to C1.

Reproduction from the component layer at level two signifies that an image is reproduced with the component numbered two. The image reproduced with the component numbered two may be considered an image on the component layer of level two (corresponding to C2). This is an image 173 in the example of FIG. 6. The image 173 on the component layer of level two is reproduced from all packets 167 through 169 applicable to C2.

In this manner, images are reproduced successively with components having corresponding numbers from three to M-1 in that order. It follows that if the numbers are suitably arranged, gray scale components may be decoded illustratively ahead of color information components as mentioned above.

The foregoing description with reference to FIGS. 2 through 6 has been about the layered structure (scalability) of JPEG 2000 for use by the encoding device11 of the embodiment shown in FIG. 1.

Described below with reference to FIGS. 7 through 22 are details of the process of encryption on layered-encoded image data under JPEG 2000. That is, the process performed by the encryption device 12 in FIG. 1 is discussed below in detail.

First to be described with reference to FIGS. 7 through 11 is block encryption. This is an example of encryption algorithm that may be used by the encryption device 12.

Block encryption is an encryption algorithm whereby data is encrypted in units of blocks. In an example of block encryption according to this encryption algorithm, one data block may be composed of 128 bits and data may be encrypted in units of 128 blocks. AES (Advanced Encryption Standard) is a well-known block encryption scheme today. However, AES is not limitative of the encryption algorithms that may be utilized by the encryption device 12; any kind of block encryption may be used as long as data is encrypted in units of blocks.

Where block encryption is adopted by the encryption device 12, there are several use modes in which to carry out the encryption. Five use modes will be described below, one by one, with reference to FIGS. 7 through 11.

Figure 7:
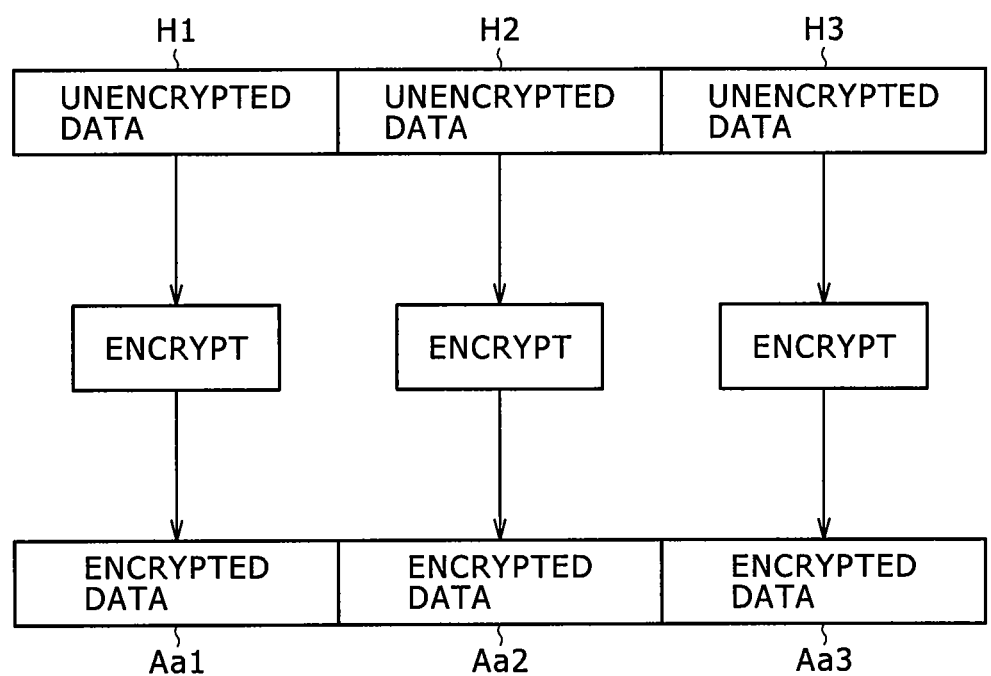
FIG. 7 is a schematic view explanatory of an encryption algorithm (use mode) for use by an encryption device included in FIG. 1.

FIG. 7 is a schematic view explanatory of ECB mode (electronic code-block mode), one of the five use modes.

In FIG. 7, each rectangular symbol with "Encrypt" written inside represents a process whereby input data is encrypted before being output. While there are three such symbols in the example of FIG. 7, that does not mean three encryption devices or encryption apparatuses are needed; the symbols simply indicate that encryption is performed three times.

Each rectangular symbol with "Unencrypted Data" written inside denotes an item of unencrypted data. Three symbols H1 through H3 thus represent three consecutive items of unencrypted data.

Each rectangular symbol with "Encrypted Data" written inside stands for an item of encrypted data that comes out of a single pass of encryption.

The above symbols are assumed to have the same significance throughout FIGS. 8 through 11, to be explained later.

In ECB mode, as shown in FIG. 7, each of the three unencrypted data items H1 through H3 is encrypted so that the encryption provides three encrypted data items Aa1 through Aa3. In other words, unencrypted data items correspond to encrypted data items on a one-to-one basis. If at least two of the unencrypted data items H1 through H2 have the same content, e.g., if the unencrypted data items H1 and H2 share the same content, then the corresponding encrypted data items Aa1 and Aa2 have the same data content as well. As such, ECB mode is easier to implement than any other mode to be described below. A major disadvantage of this mode is that it is not very suitable for statistical processing.

Figure 8:
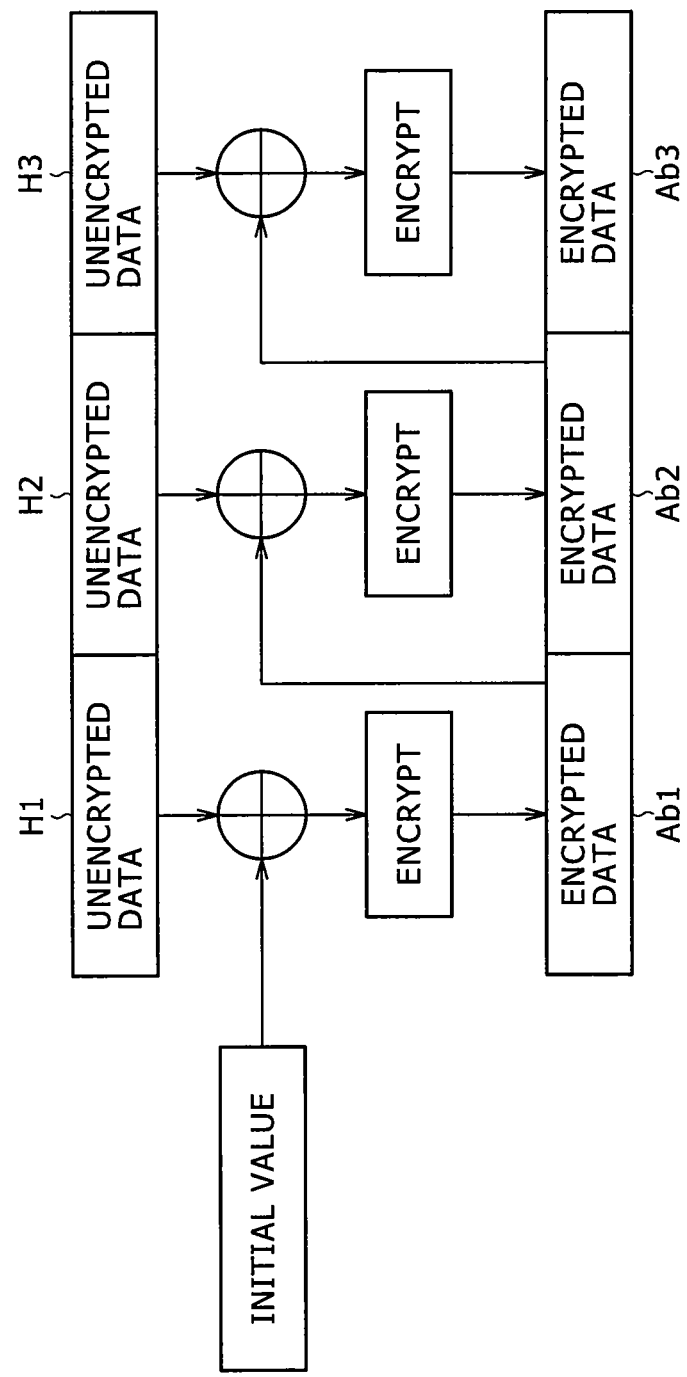
FIG. 8 is a schematic view explanatory of another encryption algorithm (use mode) for use by the encryption device in FIG. 1.

Described below with reference to FIG. 8 is CBC mode (cipher block chaining mode).

In FIG. 8, a rectangular symbol with "Initial Value" written inside represents initial value data. Each circular symbol with a cross written inside denotes a process whereby two input data items are exclusive-OR'ed and the result of the operation is output. While there are tree circular symbols in the example of FIG. 8, that does not mean three exclusive-OR devices or three exclusive-OR apparatuses are needed; the symbols simply indicate that the exclusive-OR operation is performed three times. The symbols H1 through H3 represent the same unencrypted data items as those in FIG. 7. These symbols are assumed to have the same significance throughout FIGS. 9 through 11, to be described later.

In CBC mode, as shown in FIG. 8, the unencrypted data item H1 and the initial value are first exclusive-OR'ed and the result of the operation is encrypted into an encrypted data item Ab1. The encrypted data item Ab1 and the next unencrypted data item H2 are then exclusive-OR'ed and the result of the operation is encrypted into an encrypted data item Ab2. The encrypted data item Ab2 and the next unencrypted data item H3 are exclusive-OR'ed likewise and the result of the operation is encrypted into an encrypted data item Ab3.

In CBC mode, as described, even if some of the unencrypted data items have the same content, they result in differently encrypted data. In that sense, CBC mode may be considered a more powerful encryption algorithm than the above-described EBC mode in FIG. 7. For this reason, CBC mode is used extensively today.

In EBC mode of FIG. 7 and in CBC mode of FIG. 8, the length of encrypted data is an integer multiple of blocks. That means padding is provided at the end of the unencrypted data.

By contrast, the use modes to be explained below with reference to FIGS. 9 through 11 eliminate the need for the padding process.

Figure 9:
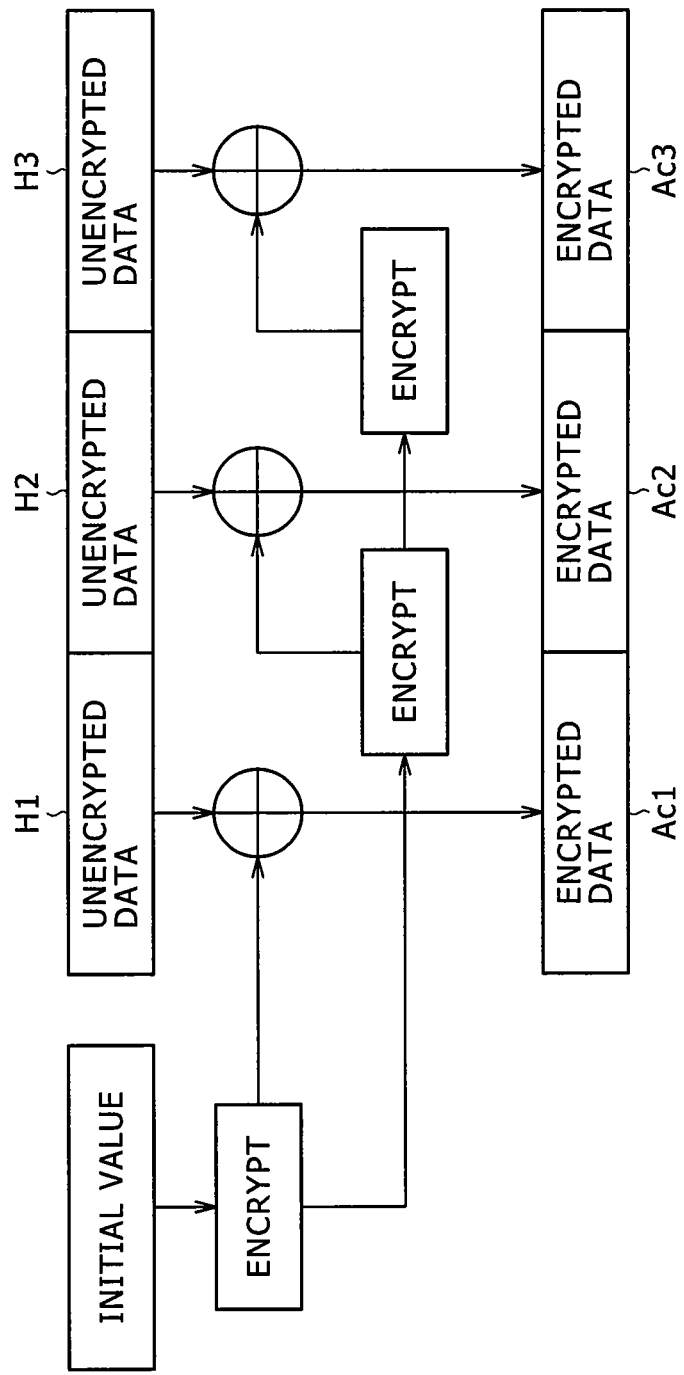
FIG. 9 is a schematic view explanatory of another encryption algorithm (use mode) for use by the encryption device in FIG. 1.

FIG. 9 is a schematic view explanatory of OFB mode (output feedback mode).

In OFB mode, as shown in FIG. 9, an initial value is first encrypted. The encrypted initial value is exclusive-OR'ed with the unencrypted data item H1 to provide an encrypted data item Ac1. The initial value encrypted once is again encrypted (i.e., encrypted twice), and the twice-encrypted initial value is exclusive-OR'ed with the next unencrypted data item H2 to provide an encrypted data item Ac2. The initial value encrypted twice is again encrypted (encrypted three times), and the thrice-encrypted initial value is exclusive-OR'ed with the next unencrypted data item H3 to provide an encrypted data item Ac3.

In OFB mode, as described above, the initial value is encrypted repeatedly before being exclusive-OR'ed with the next unencrypted data item, whereby encrypted data items are acquired successively.

Figure 10:
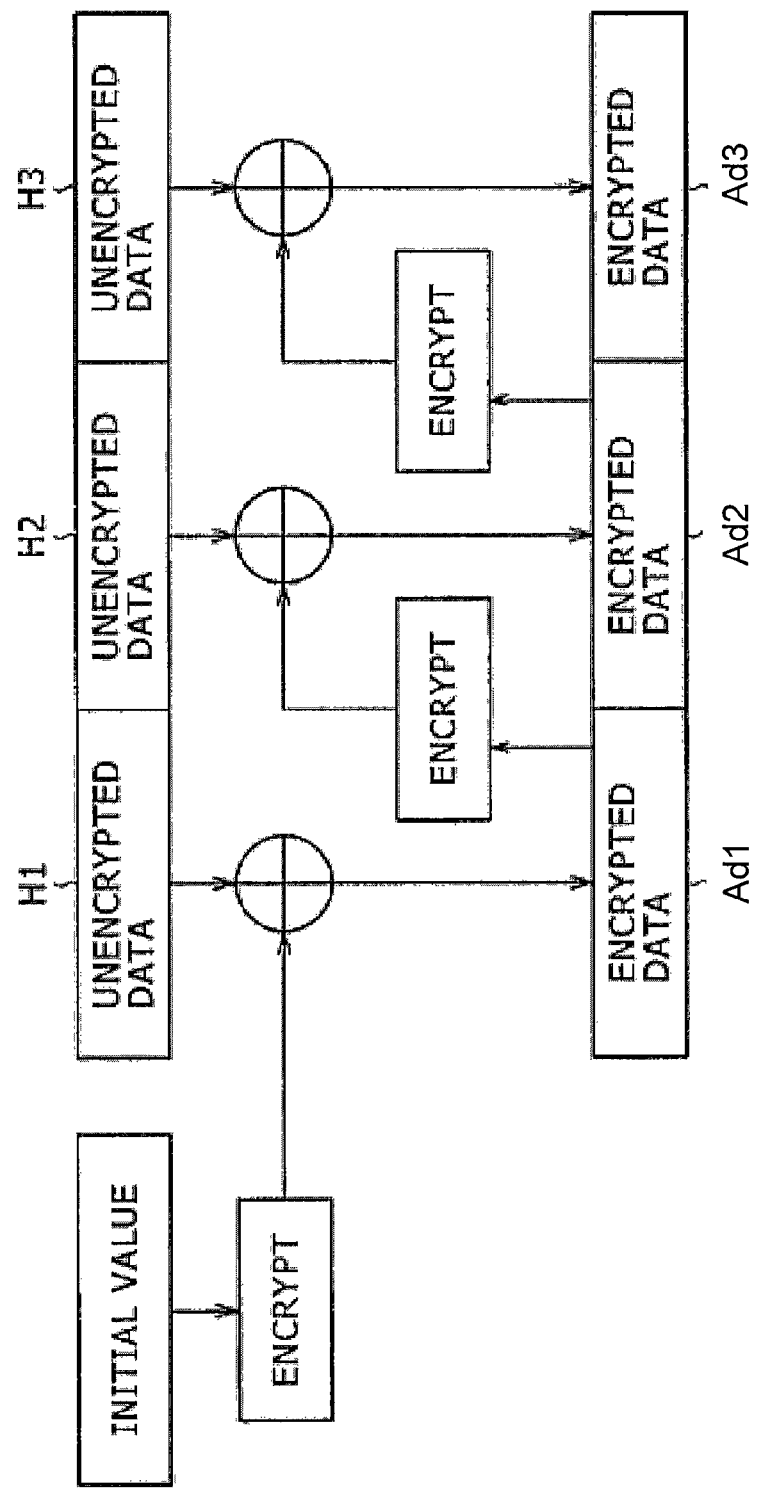
FIG. 10 is a schematic view explanatory of another encryption algorithm (use mode) for use by the encryption device in FIG. 1.

FIG. 10 is a schematic view explanatory of CFB mode (cipher feedback mode).

In CFB mode, as shown in FIG. 10, an initial value is first encrypted. The encrypted initial value is exclusive-OR'ed with the unencrypted data item H1 to provide an encrypted data item Ad1. The encrypted data item Ad1 is further encrypted, and the resulting encrypted data is exclusive-OR'ed with the next unencrypted data item H2 to provide an encrypted data item Ad2. The encrypted data item Ad2 is further encrypted, and the resulting encrypted data is exclusive-OR'ed with the next unencrypted data item H3 to provide an encrypted data item Ad3.

In CFB mode, as described above, the encrypted data item of the preceding block is encrypted, and the resulting encrypted data is exclusive-OR'ed with the unencrypted data item of the current block to provide an encrypted data item for the current block.

Figure 11:
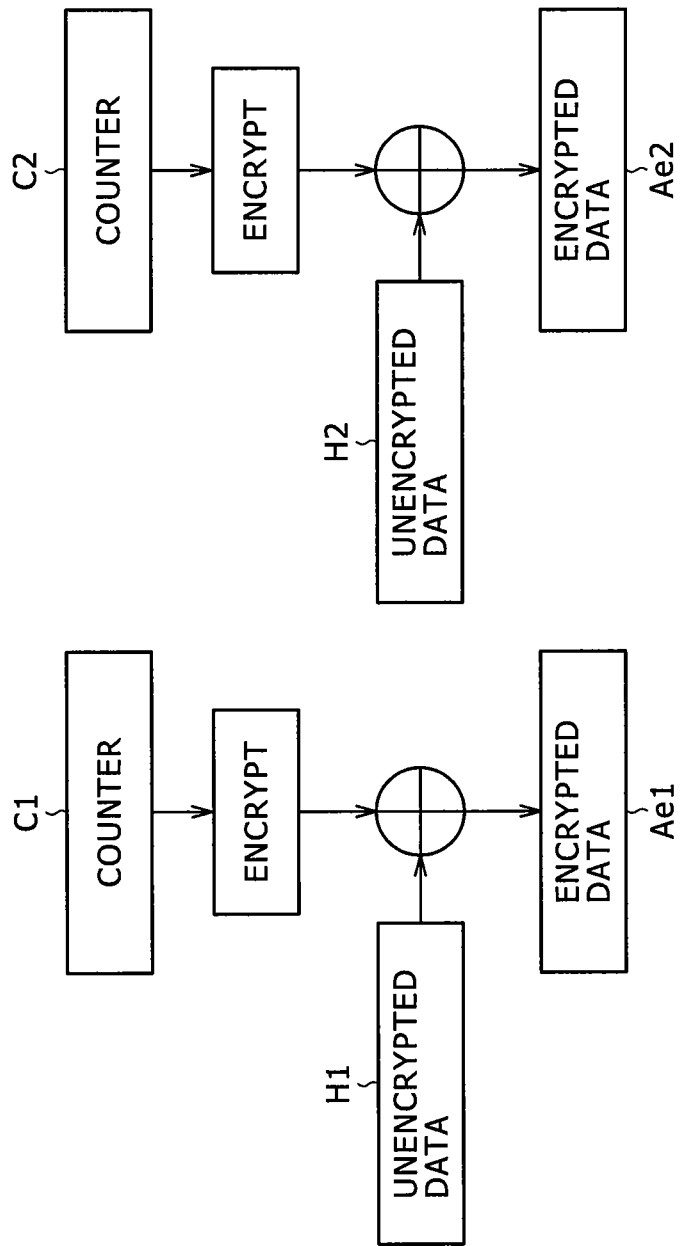
FIG. 11 is a schematic view explanatory of another encryption algorithm (use mode) for use by the encryption device in FIG. 1.

FIG. 11 is a schematic view explanatory of CTR mode (counter mode). CTR mode is an extensively used mode in the field of wireless communications.

In FIG. 11, each rectangular symbol with "Counter" written inside represents a predetermined counter value. Different reference characters C1 and C2 attached to the symbols indicate that a different counter value is used every time encryption is performed. In the example of FIG. 11, the counter value C1 is applied to the first unencrypted data item H1 and the counter value C2 to the next unencrypted data item H2.

In CTR mode, as shown in FIG. 11, the counter value C1 is first encrypted. The encrypted counter value is exclusive-OR'ed with the unencrypted data item H1 to provide an encrypted data item Ae1. The counter value C2 different from the counter value C1 is then encrypted. The counter value thus encrypted is exclusive-OR'ed with the next unencrypted data item H2 to provide an encrypted data item Ae2.

In OFB mode of FIG. 9, in CFB mode of FIG. 10 and in CTR mode of FIG. 11, the length of the unencrypted data becomes equal to that of the encrypted data as described above. This eliminates the need for the padding process.

The foregoing has been the explanation of the five use modes that may be adopted when the encryption device 12 in FIG. 1 resorts to block encryption.

In FIG. 1, the source image encoded by the encoding device 11 (i.e., layered-encoded image data) is assumed to be the data that represents a still image. In practice, however, the data may well correspond to a moving image. In other words, the source image can be a moving image. In that case, the simplest encryption that may be performed by the encryption device 12 will involve encrypting all layered-encoded image data corresponding to the moving image. This encryption process, however, is not suitable for the encryption device 12 because it annihilates frame-by-frame independence.

Figure 12:
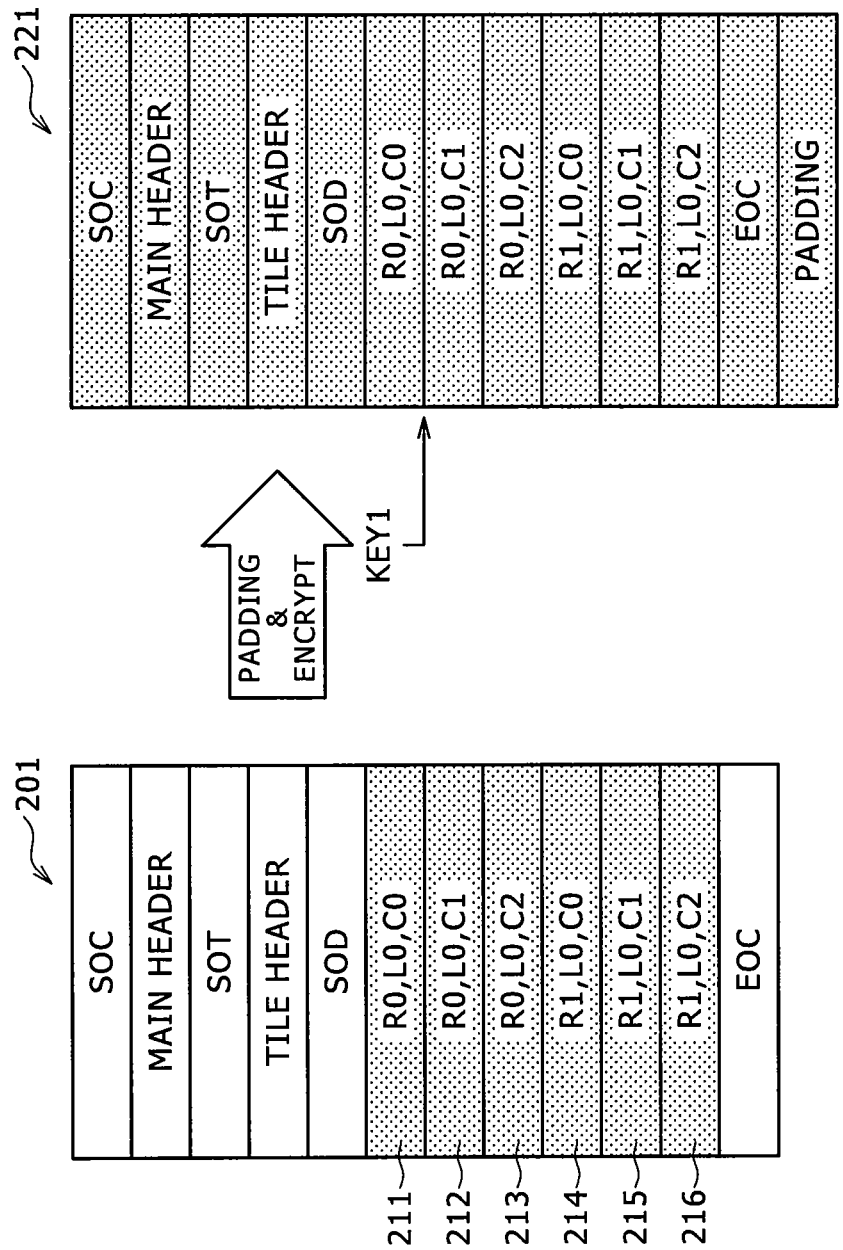
FIG. 12 is a schematic view explanatory of a traditional encryption process.

What is at least needed here is a frame-by-frame encryption scheme such as one shown illustratively in FIG. 12. Layered-encoded image data 201 indicated in FIG. 12 is data that corresponds to a single frame (still image).

The layered-encoded image data 201 complies with the same RLCP spatial resolution scalability scheme as that shown in FIG. 2. That is, the same header as that in FIG. 2 is followed by a bit stream (actual data corresponding to the source image) split into six packets211 through 216. As indicated by the descriptions in the packets 211 through 216, decoding the packets 211 through 213 for reproduction provides an image on the spatial resolution layer of level zero (R0). Decoding all the packets 211 through 216 for reproduction provides an image on the spatial resolution layer of level one (R1).

A hollow arrow in FIG. 12, as is evident from the description inside, indicates padding and encryption to be carried out. As mentioned above, the padding process becomes unnecessary depending on the use mode for encryption.

As shown in FIG. 12, the encryption device 12 may encrypt all layered-encoded image data 201 using an encryption key Key1 and output the resulting encrypted source image data 221. The encrypted source image data221 is "padded" encrypted source image data as indicated by the padding portion suffixed to the last packet.

Figure 13:
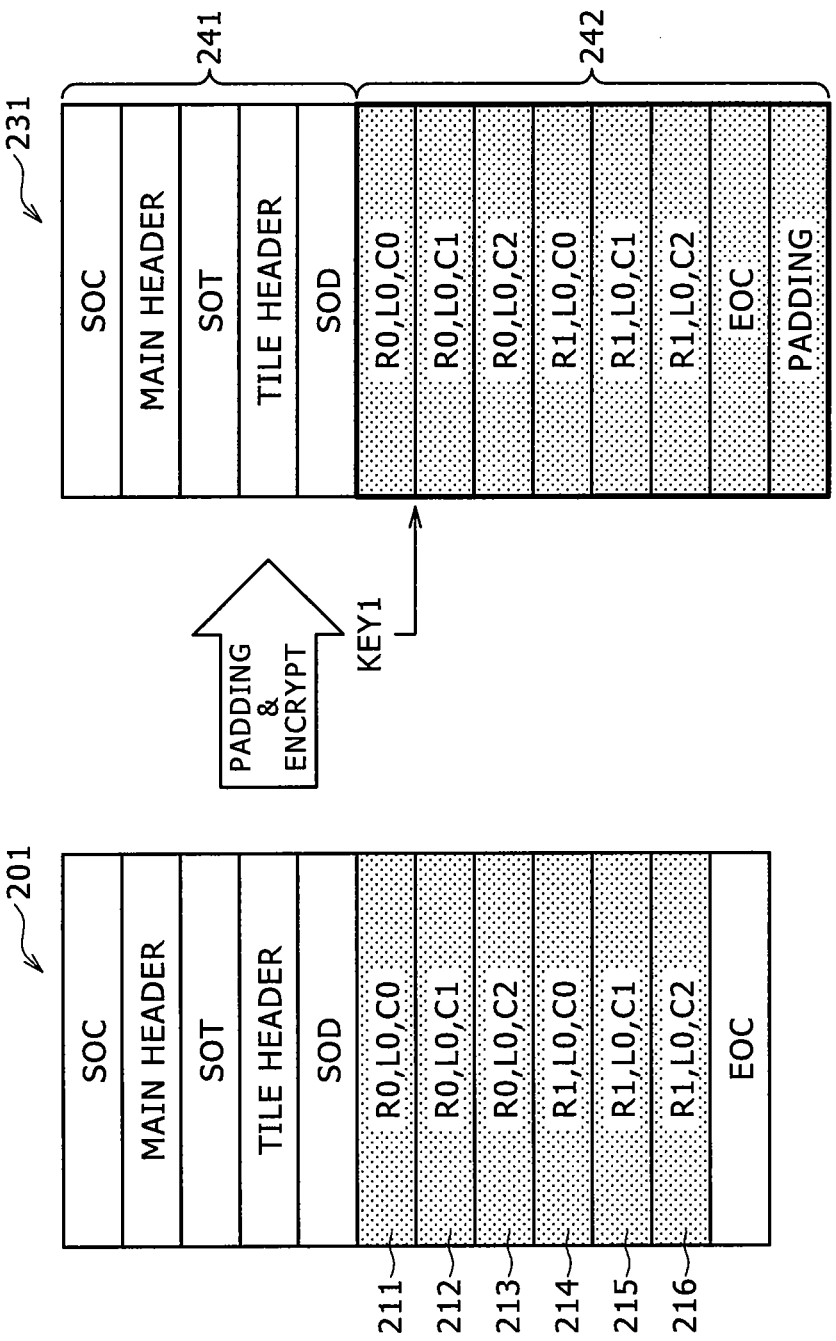
FIG. 13 is a schematic view explanatory of another traditional encryption process.

Alternatively, as shown in FIG. 13, the encryption device 12 may encrypt all layered-encoded image data 201 except for the header (ranging from SOC to SOD) by use of the encryption key Key1. That is, using the encryption Key1, the encryption device 12 can encrypt the packets 211 through 216 making up the bit stream and the EOC. The encryption device 12 may further appropriate the header of the layered-encoded image data201 for a header 241 that may be placed ahead of the encrypted data 242 derived from such encryption. The resulting encrypted source image data 231 may then be output. The encrypted source image data 231 is also "padded" encrypted source image data with the padding portion suffixed to the last packet.

The encryption processes shown in FIGS. 12 and 13 have been utilized traditionally. As is evident from the illustrations, the encrypted source image data 221 in FIG. 12 and the encrypted source image data 231 in FIG. 13 have lost scalability which is a distinct feature under JPEG 2000. If it is desired to reproduce an image on the spatial resolution layer of level zero, the packets 211 through 213 need only be decoded as explained above. However, it is difficult (practically impossible) to extract and decrypt only the portion (encrypted data) composed of the packets 211 through 213 out of the encrypted source image data 221 in FIG. 12 and out of the encrypted source image data 231 in FIG. 13. What needs to be done here is to decrypt all encrypted source image data 221 in FIG. 12 or all encrypted source image data231 in FIG. 13 in order to reconstruct all layered-encoded image data 201. Only then can the packets 211 through 213 be extracted and decoded. Otherwise the partial decoding of the packets 211 through 213 is difficult to achieve (i.e., practically impossible).

As long as it is virtually impossible to find packet delimiters in the source image data encrypted conventionally as shown in FIGS. 12 and 13, the above-mentioned problem is difficult to solve. Rather the problem recurs from attempts to circumvent it.

The SOP marker, one of the markers according to JPEG 2000 and prefixed to each packet, may be used easily to distinguish one packet from another in unencrypted layered-encoded image data. However, when an entire bit stream is encrypted as shown in FIGS. 12 and 13, the SOP marker is also encrypted and cannot be utilized as a packet delimiter. Even if the SOP markers are left unencrypted, some of the encrypted data may well coincide with an unencrypted SOP marker. In such a case, the decryption apparatus 2 in FIG. 1 can misidentify the encrypted data part coinciding with the SOP marker as an SOP. The possibility of such misidentification makes the use of SOP markers unfit for packet distinction purposes.

Under such circumstances, this applicant has come up with the encryption process to be described below as capable of resolving the traditionally experienced problem without recourse to the SOP marker. The inventive process, carried out by the encryption device 12, involves splitting layered-encoded image data into layer-by-layer encoded data items and individually encrypting each of the encoded data items. The resulting layer-by-layer encrypted split data items are arrayed into a predetermined order. The data array is supplemented with identification data for identifying a position and a size (data length) of each of the layer-by-layer encoded split data items. The resulting data assembly is output as the ultimate encrypted source image data.

The identification data may be of any kind as long as it can identify the position and size of each of the layer-by-layer encrypted split data items as mentioned above. The identification data may be placed anywhere in the encrypted source image data.

With this embodiment of the invention, layered-encoded image data is obtained by layered-encoding the source image according to JPEG 2000. It follows that, if the layer-by-layer encrypted split data items derived from the source image data are arrayed in keeping with the progression of the packets constituting the unencrypted layered-encoded image data, then the header of the unencrypted layered-encoded image data may be used as identification data with no change added to it. That is, the header of the unencrypted layered-encoded image data may be appropriated for the identification data. The header and each of the layer-by-layer encrypted split data items may be arrayed into the same progression as that of the packets in the unencrypted layered-encoded image data. This data array may be utilized as the encrypted source image data.

Figure 14:
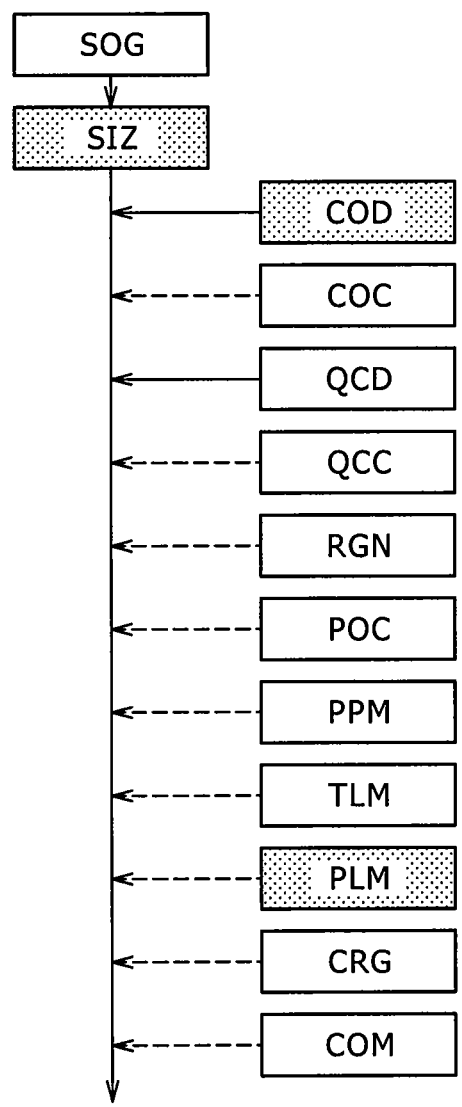
FIG. 14 is a schematic view showing a structure of a JPEG 2000-based main header necessary for an encryption process according to the present invention.
Figure 16:
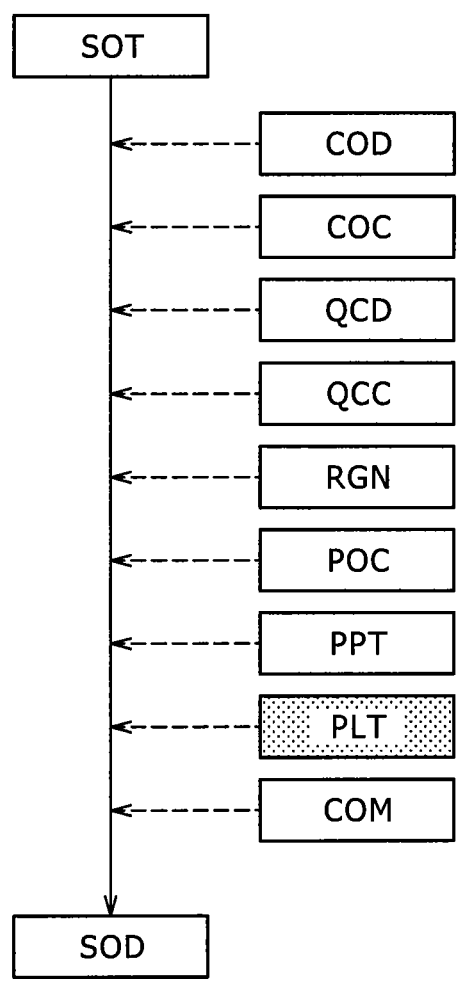
FIG. 16 is a schematic view showing a structure of a JPEG 2000-based tile header necessary for the encryption process according to the present invention.

The arrangements above are made possible because of the fact that SIZ and COD included in the main header shown in FIG. 14 as well as PLM in the main header, or PLT included in the tile header shown in FIG. 16 can be used in determining the position and size of each of layer-by-layer encrypted split data items.

Described below with reference to FIGS. 14 through 17 are SIZ, COD and PLM included in the main header, as well as PLT included in the tile header.

FIG. 14 schematically shows a typical structure of the main header according to JPEG 2000.

The main header follows SOC as described above. As shown in FIG. 14, the main header is constituted by SIZ which is a marker placed immediately behind SOC; by COD and COC which are mandatory marker segments; and by QCD, QCC, RGN, POC, PPM, TLM, PLM, CRG, and COM which are optional marker segments.

As described above, SIZ, COD and PLM out of the components of the main header can be utilized as part of the elements for identifying the position and size of each of the layer-by-layer encrypted split data items. Each of SIZ, COD and PLM will be explained below separately.

SIZ is a marker that describes various kinds of information (tile size, component count, etc.) about the target image (source image in FIG. 1 in this case).

COD is a mandatory marker that describes the default coding style. If the tile is split into multiple tile parts, COD is attached to the first tile part. COD contains a progressive order (information for identifying the above-mentioned LRCP, RLCP, RPCL, PCRL, and CPRL), a layer count, and color conversion information.

PLM is an optional marker that describes a list of the packet lengths of the tile part.

A typical structure of PLM is shown in FIG. 15. The components of PLM will now be described by referring to FIG. 15.

As shown in FIG. 15, PLM (marker segment) is made up of PLM (parameter), Lplm, Zplm, Nplm(i), and Iplm (i, j) ("i" is any number between one and "n"; "j" is any number between one and "n"; and "n" and "m" are each any integer that is dependent on the number of tiles and on the number of packets).

PLM is a marker. Lplm denotes the size of this marker segment (PLM). ZPlm represents an identification number of the PLM marker. Nplm(i) indicates the number of bytes in Iplm in the i-th tile part. Iplm(ij) stands for the length of the j-th packet in the i-th tile part.

The foregoing has been the description of SIZ, COD, and PLM in the main header according to JPEG 2000 as typical information that can be used to identify the position and size of each of the layer-by-layer encrypted split data items.

The components of the main header other than SIZ, COD and PLM will not be described here. The other components are not used in connection with the encryption and decryption processes of this embodiment. Furthermore, these components are defined as part of the coding formats under JPEG 2000 and are thus well known to those skilled in the art.

As opposed to the main header structure explained above, a typical tile header structure is indicated in FIG. 16. FIG. 16 shows how the tile header is structured.

As mentioned above, the tile header comes between SOT and SOD. As illustrated in FIG. 16, the tile header is constituted by COD and COC which are mandatory marker segments, and by QCD, QCC, RGN, POC, PPM, PLT, and COM which are optional marker segments.

Like the above-described PLM, PLT which is one of the components of the tile header can be used as part of the information for identifying the position and size of each of the layer-by-layer encrypted split data items. What follows is a description of PLT.

PLT is an optional marker segment that describes the list of the packet lengths of the tile part.

Figure 17:
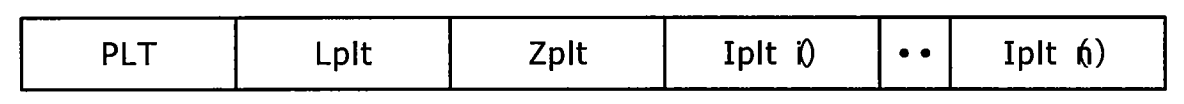

FIG. 17 schematically shows a typical structure of PLT. The components of PLT are described below by referring to FIG. 17.

As shown in FIG. 17, PLT (marker segment) is constituted by PLT (parameter), Lplt, Zplt, and Iplt(i)(i is any number between one and "n," "n" being any integer that is dependent on the number of packets).

PLT is a marker. Lplt denotes the size of this marker segment (PLT). Zplt represents an identification number of the PLT marker. Iplt(i) indicates the length of the i-th packet.

The components of the tile header other than PLT will not be explained here. The other components are not used in connection with the encryption and decryption processes of this embodiment. Furthermore, these components are defined as part of the coding formats under JPEG 2000 and are thus well known to those skilled in the art.

As mentioned above, PLM and PLT are each an optional marker that describes the list of packet lengths of the tile part. That is, the information described in each of PLM and PLT denotes the lengths of all packets in an encoded code stream. While PLM is written separately in each tile, PLT describes successively the lengths of all packets included in the tile.

For that reason, either PLT or PLM is sufficient for identifying the position and size of each of layer-by-layer encrypted split data items; it is not necessary to utilize both PLT and PLM. When layered-encoding the source image data according to JPEG 2000, the encoding device11 in FIG. 1 need only write necessary information to either PLT or PLM.

To recapitulate the foregoing description about this embodiment, layered-encoded image data is split into layer-by-layer encoded data items that are individually encrypted. This produces layer-by-layer encrypted split data items that are arranged into a predetermined order, whereby the encrypted source image data is created. In this case, it may be desired to extract a particular encrypted split data item from the encrypted source image data. This requires obtaining the position (offset position) and size of the encrypted split data item to be extracted. That requirement is fulfilled by use of identification data capable of identifying the position and size of each of the layer-by-layer encrypted split data items, the identification data being included in the encrypted source image data applicable to this embodiment.

If, in the above setup, the unencrypted layered-encoded image data has no information that could be used as the identification data, then it is necessary to create anew identification data during the encryption process (performed by the encryption device 12 in FIG. 1).

In the case of this embodiment, unencrypted layered-encoded image data is encoded according to JPEG 2000. The JPEG 2000-based header (i.e., main header or tile header) contains information such as SIZ, COD, PLM, and PLT that can be used to determine the position and size of each of the layer-by-layer encrypted split data items. Thus there is no need for this embodiment to create identification anew during the encryption process; the header of the layered-encoded image data can be appropriated for the identification data with not change made to it.

In the end, the encrypted source image data is obtained through the encryption process of this embodiment as follows: the header of the unencrypted layered-encoded image data is appropriated for a new header. The appropriated header and layer-by-layer encrypted split data items are arrayed in keeping with the progression of the packets constituting the unencrypted layered-encoded image data. The resulting data array is output as the ultimate encrypted source image data by the encryption device 12 shown in FIG. 1.

Examples of such encrypted source image data are shown in FIGS. 18 through 22. Described below in reference to FIGS. 18 through 22 are these examples of encrypted source image data, along with the encryption process (according to the present invention) capable of creating such encrypted source image data.

Figure 18:
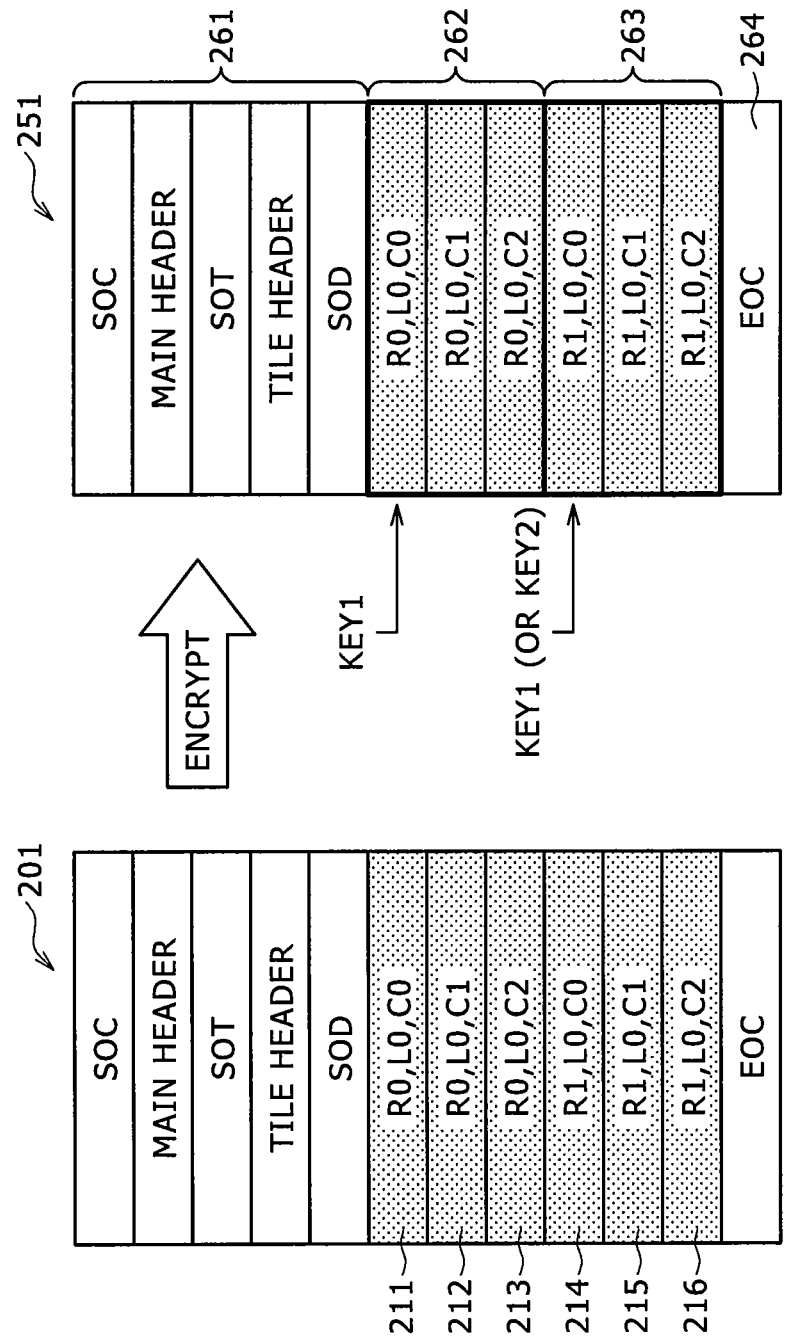
FIG. 18 is a schematic view explanatory of the encryption process according to the present invention, the process being carried out by the encryption device in FIG. 1.

FIG. 18 indicates the layered-encoded image data201 already shown in FIGS. 12 and 13 and explained above in connection with the conventional process of encryption. FIG. 18 further illustrates encrypted source image data251 obtained by submitting the layered-encoded image data201 to the inventive encryption process.

To repeat the foregoing description, the unencrypted layered-encoded image data 201 is the layered-encoded image data that complies with the same RLCP spatial resolution scalability scheme as that shown in FIG. 2. In the layered-encoded image data, the same header as that in FIG. 2 is followed by a bit stream (actual data representing the source image) made up of six packets 211 through 216. As indicated by the descriptions in the packets 211 through 216, decoding the packets 211 through 213 for reproduction provides an image on the spatial resolution layer of level zero (R0). Decoding all the packets 211 through 216 for reproduction provides an image on the spatial resolution layer of level one (R1).

Initially, the encryption device 12 in FIG. 1 splits the layered-encrypted image data 201 into a header (ranging from SOC to SOD) and a bit stream and then divides the bit stream into layer-by-layer encoded data. In the example of FIG. 18, the encryption device 12 splits the layered-encoded image data 201 into first encoded data composed of the packets 211 through 213 and second encoded data constituted by the packets 214 through 216.

The encryption device 12 then individually encrypts each of the layer-by-layer encoded data items. In the example of FIG. 18, the encryption device 12 encrypts the first encoded data made up of the packets211 through 213 using the encryption key Key1. This produces encrypted split data 262 having the spatial resolution layer at level zero (corresponding to R0). The encryption device 12 further encrypts the second encoded data composed of the packets 214 through 216 using the encryption key Key1. A different key Key2 may be used in place of the key Key1. This produces encrypted split data 263 having the spatial resolution layer at level one (corresponding to R1).

The encryption device 12 appropriates the header (ranging from SOC to SOD) of the unencrypted layered-encoded image data 201 for a header 261. The header 261, encrypted split data 262, encrypted split data 263, and EOC 264 are arrayed in keeping with the packet progression in the unencrypted layered-encoded image data201. The resulting data array provides the ultimate encrypted source image data 251 that is supplied to the recording control device 13 in FIG. 1.

As a result, out of the encrypted source image data 251, the decryption apparatus 2 in FIG. 1 may extract only the encrypted data on a low spatial resolution level, i.e., encrypted split data 262 on the spatial resolution layer of level zero. The partial data extraction is available for two reasons: because the length (size) of all packets corresponding to R0 (encrypted split data 262 in this example) can be calculated based on the PLM or PLT marker in the header261; and because the offset of the starting packet position (the beginning of the encrypted split data 262 in this case) relative to SOD can be calculated using SIZ or COD in the header 261.

That each of the encoded data in different layers can be individually encrypted signifies that an encryption key can be changed for every layer. For example, the encoded data on the spatial resolution layer of level zero (i.e., packets 211 through 213 corresponding to R0) is encrypted using the encryption key Key1. The encoded data on the spatial resolution layer of level one (packets 214 through 216 corresponding to R1) may be encrypted using either the encryption key Key1 or the encryption key Key2. If the encryption key Key2 is used for the encryption and if the decryption apparatus 2 possesses only the encryption key Key1, then the source image cannot be reproduced on the spatial resolution layer of level one (corresponding to R1). In order to reproduce the source image on the resolution layer of level one, the decryption apparatus 2 must be in possession of the encryption key Key2 in addition to the encryption key Key1.

The encryption process described above with reference to FIG. 18 was the example in which padding is not necessary. Described below in reference to FIG. 19 is an example of encryption in which padding is required.

Figure 19:
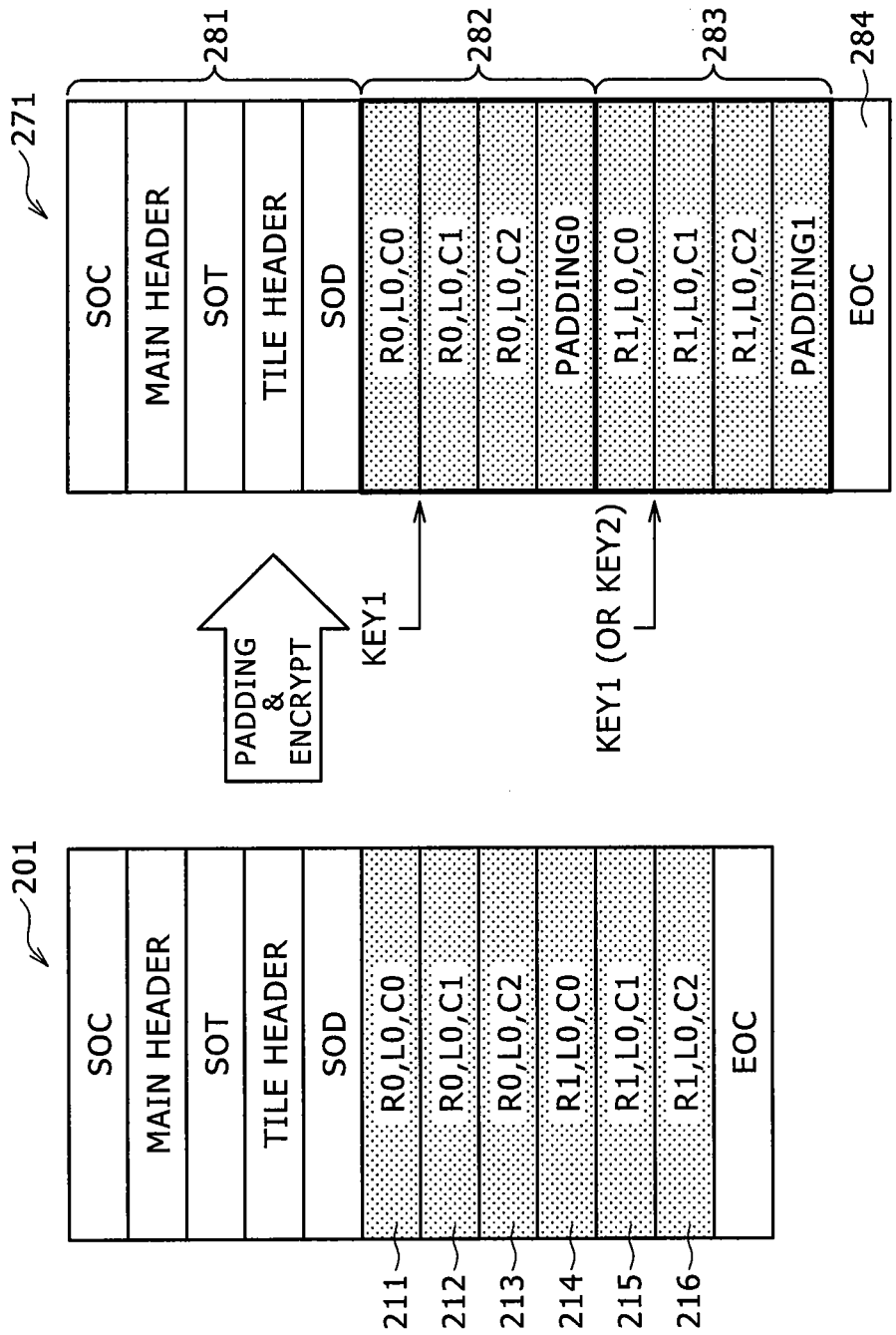
FIG. 19 is another schematic view explanatory of the encryption process according to the present invention, the process being carried out by the encryption device in FIG. 1.

FIG. 19 shows layered-encoded image data 201 and encrypted source image data 271. The layered-encoded image data 201 is the same as that in FIG. 18 (as in FIGS. 12 and 13), and the encrypted source image data 271 is obtained by subjecting the layered-encoded image data 201 to an encryption process involving padding.

The encryption device 12 in FIG. 1 initially splits the layered-encoded image data 201 into a header (ranging from SOC to SOD) and a bit stream and divides the bit stream into layer-by-layer encoded data. In the example of FIG. 19, the encryption device 12 splits the layered-encoded image data into first encoded data composed of packets 211 through 213 and second encoded data constituted by packets 214 through 216. The process up to this point is the same as what was discussed above with reference to FIG. 18.

The encryption device 12 then individually encrypts each of the layer-by-layer encoded data items. This processing step involves padding. In the example of FIG. 19, the encryption device 12 adds padding zero to the first encoded data made up of the packets 211 through 213, and encrypts the resulting data using the encryption key Key1. This provides encrypted split data 282 on the spatial resolution layer of level zero (corresponding to R0). The encryption device 12 further adds padding one to the second encoded data formed by the packets 214 through 216, and encrypts the resulting data using the encryption key Key1. The different encryption key Key2 may be used alternatively in encoding the second encoded data. This provides encrypted split data 283 on the spatial resolution layer of level one (corresponding to R1).

The subsequent flow of processing steps is the same as that discussed above with reference to FIG. 18. That is, the encryption device 12 appropriates the header (ranging from SOC to SOD) of the unencrypted layered-encoded image data 201 for a header 281. The encryption device 12 then arrays the header 281, encrypted split data 282, encrypted split data 283, and an EOC 284 in keeping with the packet progression in the unencrypted layered-encoded image data 201. The resulting data array provides the ultimate encrypted source image data 271 that is supplied to the recording control device 13 in FIG. 1.

Figure 20:
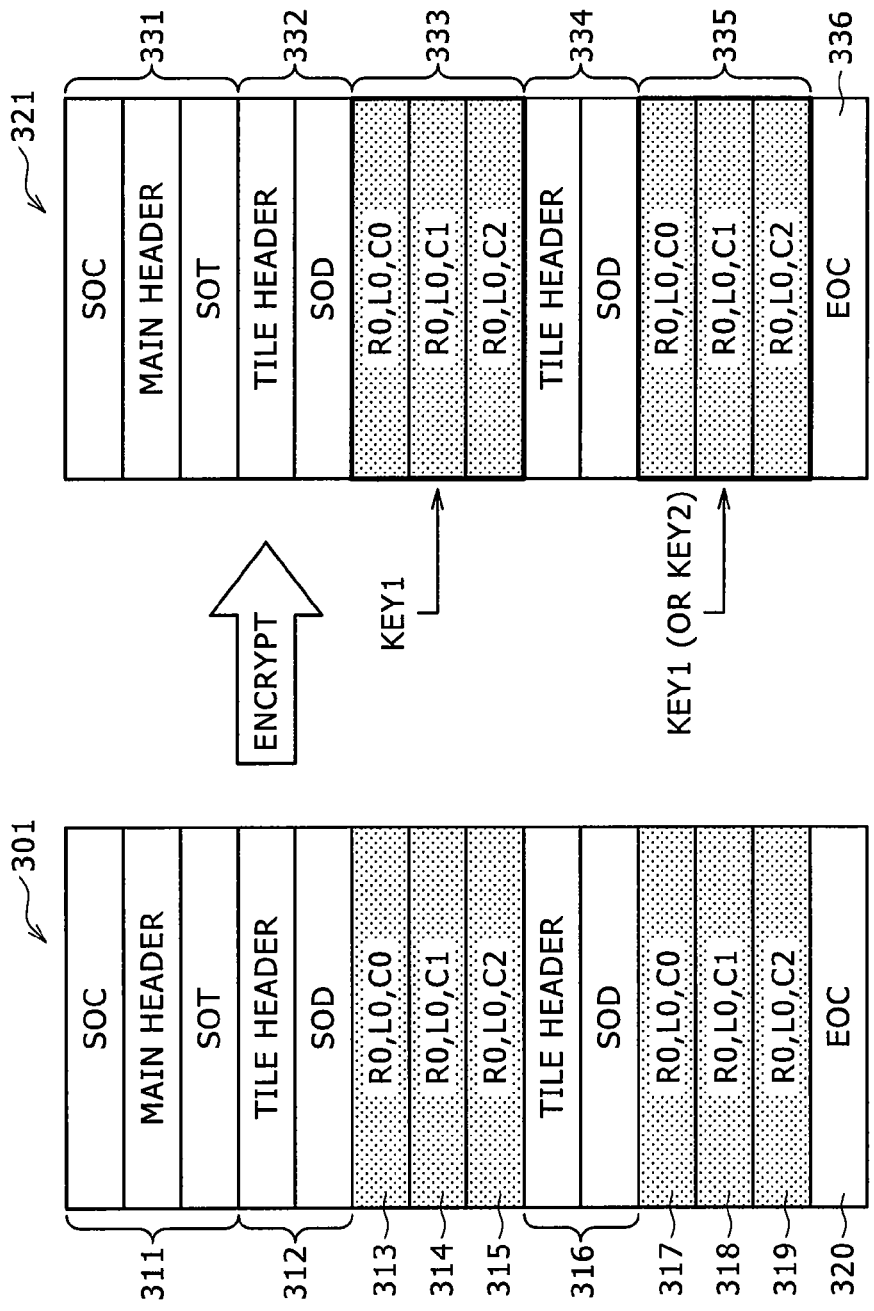
FIG. 20 is another schematic view explanatory of the encryption process according to the present invention, the process being carried out by the encryption device in FIG. 1.
Figure 21:
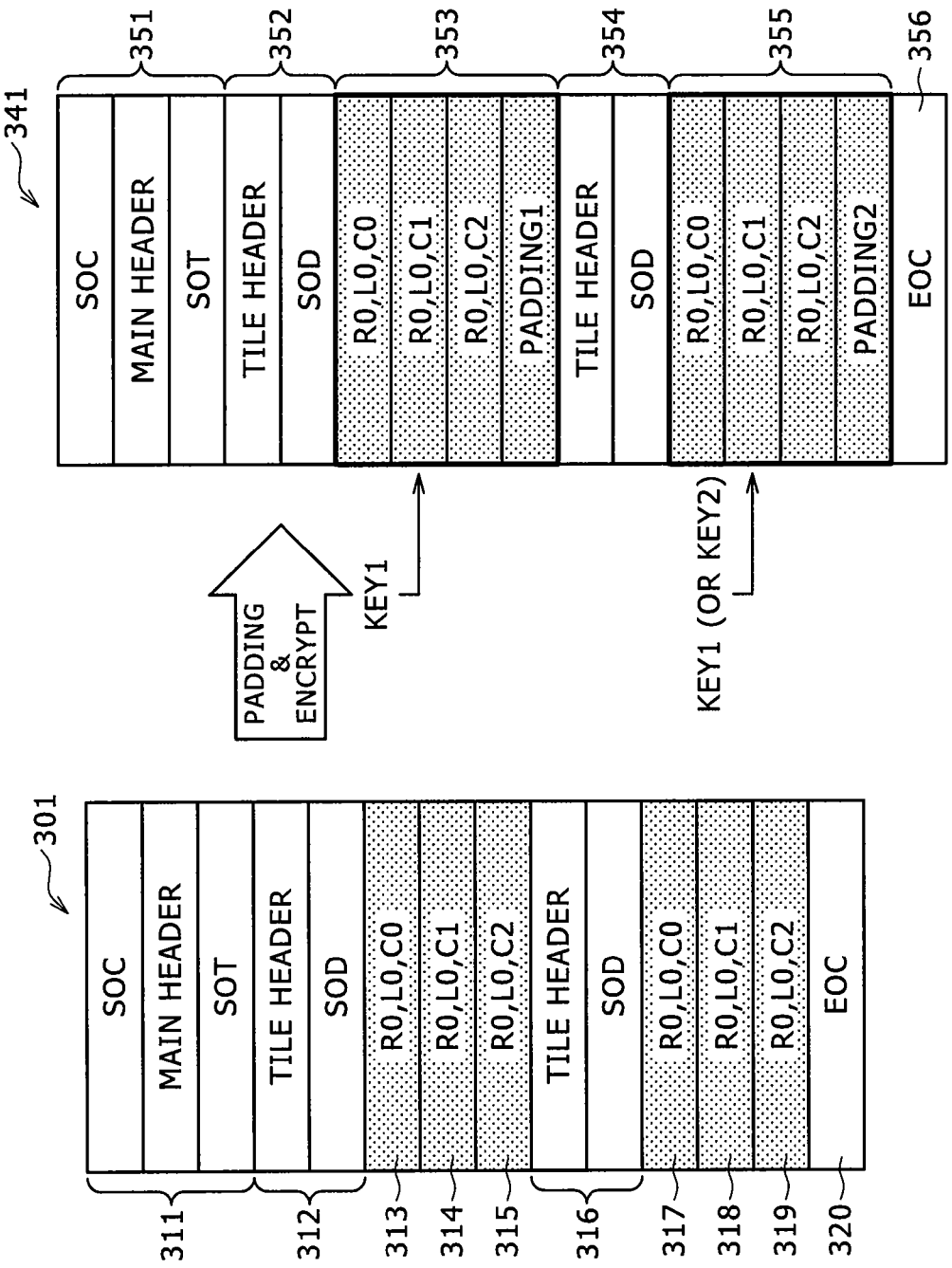
FIG. 21 is another schematic view explanatory of the encryption process according to the present invention, the process being carried out by the encryption device in FIG. 1.

Described below in reference to FIGS. 20 and 21 is how encryption is typically performed on layered-encoded image data that is split into tiles, along with specific examples of encrypted source image data resulting from such encryption. During the process, the encryption device 12 repeats the encryption on each of the tiles divided.

More specifically, where the padding process is not needed, the encryption process may take place illustratively as shown in FIG. 20.

Suppose now that layered-encoded image data 301 shown in FIG. 20 is supplied to the encryption device 12.

The layered-encoded image data 301 complies with the same RLCP spatial resolution scalability scheme as that shown in FIG. 2. However, it should be noted that the layered-encoded image data 301 is made up of a first and a second tile constituting the source image. With this structure, a tile header part (i.e., tile header and SOD) 312 following a main header part (ranging from SOC to SOT) 311 serves as the header for the ensuing bit stream of the first tile, i.e., for packets 313 through 315. A tile header part (tile header and SOD) 316 next to the packet 315 serves as the header for the ensuing bit stream of the second tile, i.e., for packets 317 through 319.

The encryption device 12 thus splits the layered-encoded image data 301 initially into the main header part 311, the tile header part 312 for the first tile, the packets 313 through 315 making up the bit stream (encoded data) of the first tile, the header 316 for the second tile, the packets 317 through 319 constituting the bit stream (encoded data) of the second tile, and an EOC 320.

Later, the encryption device 12 usually splits each tile into layer-by-layer encoded data items. In the example of FIG. 20, however, no further splitting is carried out because each tile has only one layer. That is, the spatial resolution layer is solely level zero (only the packets of R0 exist).

The encryption device 12 then individually encrypts the encoded data of each tile. In the example of FIG. 20, the encryption device 12 encrypts the first tile made up of the packets 313 through 315 using the encryption key Key1. This provides encrypted split data 333 of the first tile. The encryption device 12 further encrypts the second tile formed by the packets 317 through 319 using the encryption key Key1. The different encryption key Key2 may be used alternatively at this point. This provides encrypted split data 335 of the second tile.

The encryption device 12 then appropriates the headers of the unencrypted layered-encoded image data 301, i.e., the main header part 311, the tile header part 312 of the first tile, and the tile header part 316 of the second tile, respectively, for the main header 331, tile header part 332 of the first tile, and tile header part 334 of the second tile with no change added, whereby encrypted source image data 321 is created. That is, the encryption device 12 arrays the main header part 331, tile header part 332 of the first tile, encrypted split data 333 of the first tile, tile header part 334 of the second tile, encrypted split data 335 of the second tile, and an EOC 336 in keeping with the original packet progression. The resulting data array provides the ultimate encrypted source image data 321 that is supplied to the recording control device 13 in FIG. 1.

That each of the encoded data in different tiles can be individually encrypted signifies that an encryption key can be changed for every tile. In the above example, the encoded data of the first tile (packets 313 through 315) was shown encrypted using the encryption key Key1. The encoded data of the second tile (packets 317 through 319) may be encoded using either the encryption key Key1 or the encryption key Key2. If the encryption key Key2 is used for the encryption and if the decryption apparatus 2 possesses only the encryption key Key1, then the second tile portion of the source image cannot be reproduced. In order to reproduce the source image of all the source images, the decryption apparatus 2 must be in possession of the encryption key Key2 in addition to the encryption key Key1.

The encryption process described above with reference to FIG. 20 was the example in which padding is not necessary following the splitting of data into tiles. Described below in reference to FIG. 20 is an example of encryption in which padding is required in addition to the data division into tiles.

FIG. 21 shows layered-encoded image data 301 and encrypted source image data 341. The layered-encoded image data 301 is the same as that in FIG. 21, and the encrypted source image data 341 is obtained by subjecting the layered-encoded image data 301 to the encryption process involving padding.

The encryption device 12 first splits the layered-encoded image data 301 into a main header part 311, a tile header part 312 for a first tile, packets 313 through 315 making up the bit stream (encoded data) of the first tile, a header 316 for a second tile, packets 317 through 319 constituting the bit stream (encoded data) of the second tile, and an EOC 320. The process up to this point is the same as what was discussed above with reference to FIG. 20.

The encryption device 12 then individually encrypts the encoded data of each tile. During the process, the encryption device 12 carries out padding. In the example of FIG. 21, the encryption device 12 adds padding one to the first tile made up of the packets 313 through 315 and encrypts the resulting data using the encryption key Key1. This provides encrypted split data 353 of the first tile. The encryption device 12 then adds padding two to the second tile formed by the packets 317 through 319 and encrypts the resulting data using the encryption key Key1. The different encryption key Key2 may be used alternatively at this point. This provides encrypted split data 355 of the second tile.

The subsequent flow of processing steps is the same as that discussed above with reference to FIG. 20. That is, the encryption device 12 appropriates the headers of the unencrypted layered-encoded image data 301, i.e., the main header part 311, the tile header part 312 of the first tile, and the tile header part 316 of the second tile, respectively, for a main header 351, a tile header part 352 of the first tile, and a tile header part 354 of the second tile with no change added, whereby encrypted source image data 341 is created. That is, the encryption device 12 arrays the main header part 351, tile header part 352 of the first tile, encrypted split data 353 of the first tile, tile header part 354 of the second tile, encrypted split data 355 of the second tile, and an EOC 356 in keeping with the original packet progression. The resulting data array provides the ultimate encrypted source image data 341 that is supplied to the recording control device 13 in FIG. 1.

The examples of the encryption process explained above with reference to FIGS. 20 and 21 were cases where the tiles make up a single-layered structure only. Described below with reference to FIG. 22 is an example in which encryption is carried out where at least one of the tiles involved has a multiple-layered structure.

Figure 22:
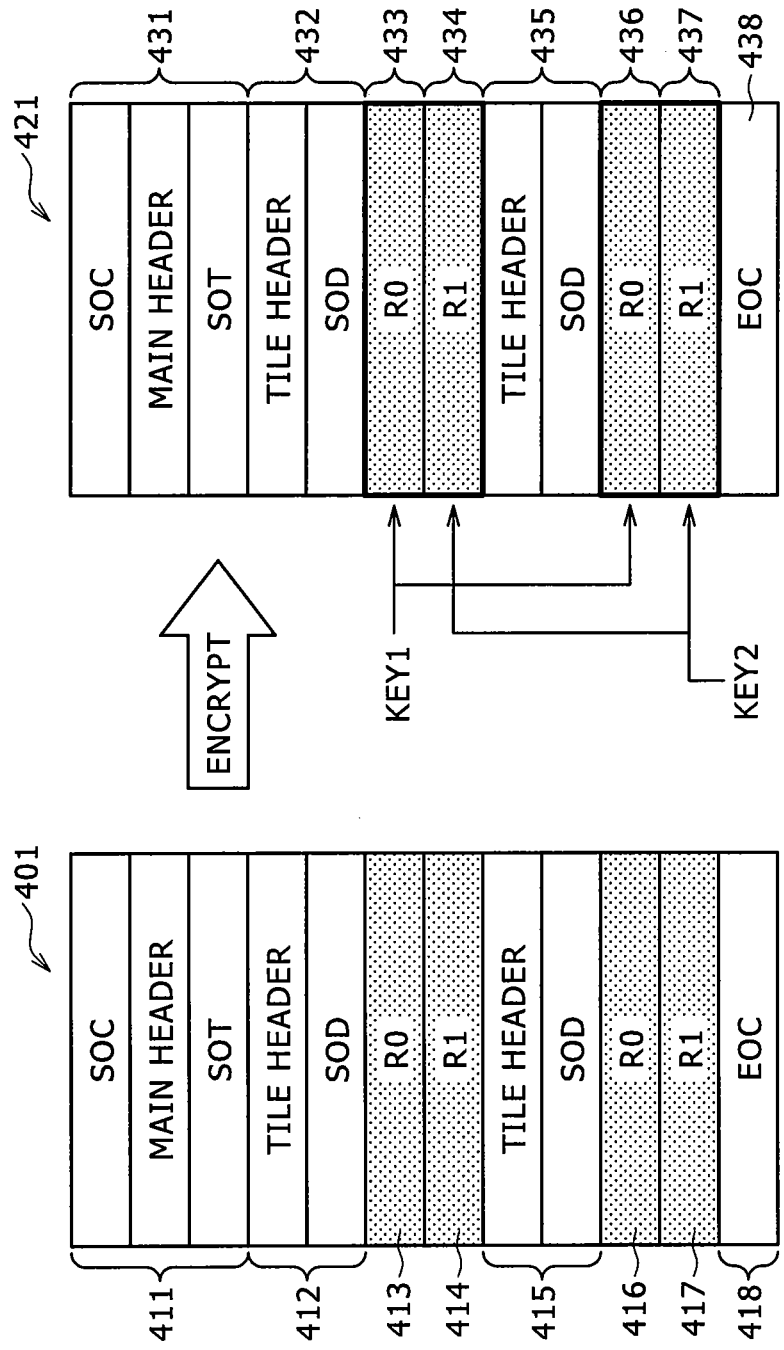
FIG. 22 is another schematic view explanatory of the encryption process according to the present invention, the process being carried out by the encryption device in FIG. 1.

Suppose now that layered-encoded image data 401 shown in FIG. 22 is supplied to the encryption device 12.

As in the above-described examples of FIGS. 20 and 21, the layered-encoded image data 401 constitutes the source image that is split into a first and a second tile. With this structure, a tile header part (i.e., tile header and SOD) 412 following a main header part (ranging from SOC to SOT) 411 serves as the header for the ensuing bit stream of the first tile, i.e., for packets 413 and 414. A tile header part (tile header and SOD) 415 next to the packet 414 serves as the header for the ensuing bit stream of the second tile, i.e., for packets 416 and 417.

The encryption device 12 thus splits the layered-encoded image data 401 initially into the main header part 411, the tile header part 412 for the first tile, the packets 413 and 414 making up the bit stream (encoded data) of the first tile, the header 415 for the second tile, the packets 416 and 417 constituting the bit stream (encoded data) of the second tile, and an EOC 418.

As can be seen from the descriptions in the packets 413, 414, 416 and 417, the layered structure of spatial resolution has two levels zero and one. The encryption device 12 thus splits the bit stream (encoded data) of the first tile into the packet 413 on the spatial resolution layer of level zero (corresponding to R0) and into the packet 414 on the spatial resolution layer of level one (corresponding to R1). Likewise the encryption device 12 splits the packets 416 and 417 making up the bit stream (encoded data) of the second tile into the packet 416 on the spatial resolution layer of level zero (corresponding to R0) and into the packet 417 on the spatial resolution layer of level one (corresponding to R1).

The encryption device 12 then individually encrypts the encoded data of each tile in each layer. In the example of FIG. 22, the encryption device 12 encrypts the packet 413 using the encryption key Key1. This provides encrypted split data 433. The encryption device 12 likewise encrypts the packet 414 using the encryption key Key2, the packet 416 using the encryption key Key1, and the packet 417 using the encryption key Key2. The key-based encryption process provides encrypted split data 434, 436, and 437.

In the above example, a different encryption key was shown to be used for each different spatial resolution level (i.e., keys Key1 and Key2 employed alternately) for the purpose of managing data decryption in terms of spatial resolution. However, the example of FIG. 22 is not limitative of the present invention. Encryption keys may be utilized in any other way (in any other combination). For example, if it is desired to manage the way data is decrypted in terms of tiles, it is possible to use the encryption key Key1 on the packets 413 and 414 and the encryption key Key2 on the packets 416 and 417. As another alternative, four different encryption keys Key1 through Key4 may be applied to the packets 413, 414, 416 and 417, respectively. In this case, it is possible to manage data decryption both with regard to spatial resolution and in terms of tiles.

Thereafter, the encryption device 12 appropriates the headers of the unencrypted layered-encoded image data 401, i.e., the main header part 411, the tile header part 412 of the first tile, and the tile header part 415 of the second tile, respectively, for the main header 431, the tile header part 432 of the first tile, and the tile header part 435 of the second tile with no change added, whereby encrypted source image data 421 is created.

That is, the encryption device 12 arrays the main header part 431, tile header part 432 of the first tile, encrypted split data 433 of the first tile on the spatial resolution layer of level zero (corresponding to R0), encrypted split data 434 of the first tile on the spatial resolution layer of level one (corresponding to R1), tile header part 435 of the second tile, encrypted split data 436 of the second tile on the spatial resolution layer of level zero (corresponding to R0), encrypted split data 437 of the second tile on the spatial resolution layer of level one (corresponding to R1), and an EOC 438 in keeping with the original packet progression. The resulting data array provides the ultimate encrypted source image data 421 that is supplied to the recording control device 13 in FIG. 1.

What was discussed above with reference to FIGS. 18 through 22 was the encryption process in effect when the progressive order (of packets) according to JPEG 2000 is pursuant to the RLCP scheme. The encryption process remains the same when the progressive order complies with any one of the other schemes described above.

In the above-described examples, all layer-by-layer encoded data items were shown to be encrypted. Alternatively, since each of the encoded data items on any given layer can be encrypted individually, it is easy to encrypt any number of the encoded data items on any layer as desired. Furthermore, in the above-described examples, all encoded data items of all tiles were shown to be encrypted. Alternatively, since each of the encoded data items of any tile can be encrypted individually, it is easy to encrypt any number of the encoded data times of any tile as desired.

In the above-described examples, the unencrypted data was assumed to be layered-encoded image data. Alternatively, any data (i.e., not limited to image data) may be used as the unencrypted data. In this case, the encryption device 12 may carry out a first through a fourth process successively, as described below.

The first process involves splitting unencrypted input data into a plurality of data items according to a predetermined rules and outputting the resulting split data items. The predetermined rule may illustratively be one which, in the foregoing examples, would require splitting the input data into a header part and a bit stream (actual data corresponding to the source image) and further dividing the bit stream into tiles on different layers.

The second process involves individually encrypting each of a desired number of split data items out of the plurality of split data items derived from the first process above, and outputting the resulting encrypted split data items.

The third process involves creating identification data. The identification data is used to identify the encrypted split data items derived from the second process upon decryption. Thus the identification data is created so as to determine the array position and size of each of the encrypted split data items in effect when the encrypted split data items, the split data items other than those dealt with in the second process out of the multiple split data items coming from the first process, and the identification data itself are arranged in a predetermined order. In the foregoing examples, the input data was assumed to be layered-encoded image data according to JPEG 2000. For that reason, the header part containing SIZ, COD, PLM, and/or PLT may be appropriated for the header with no change added to it. The predetermined order above may be the packet progression in the unencrypted layered-encoded image data.

The fourth process involves outputting the data array in which the encrypted split data items, the unencrypted split data items, and the identification data created in the third process are arrayed in the above-mentioned predetermined order, as the encrypted input data representative of the input data. The encrypted source image data referred to in the above-described examples is the encrypted input data thus created.

Figure 23:
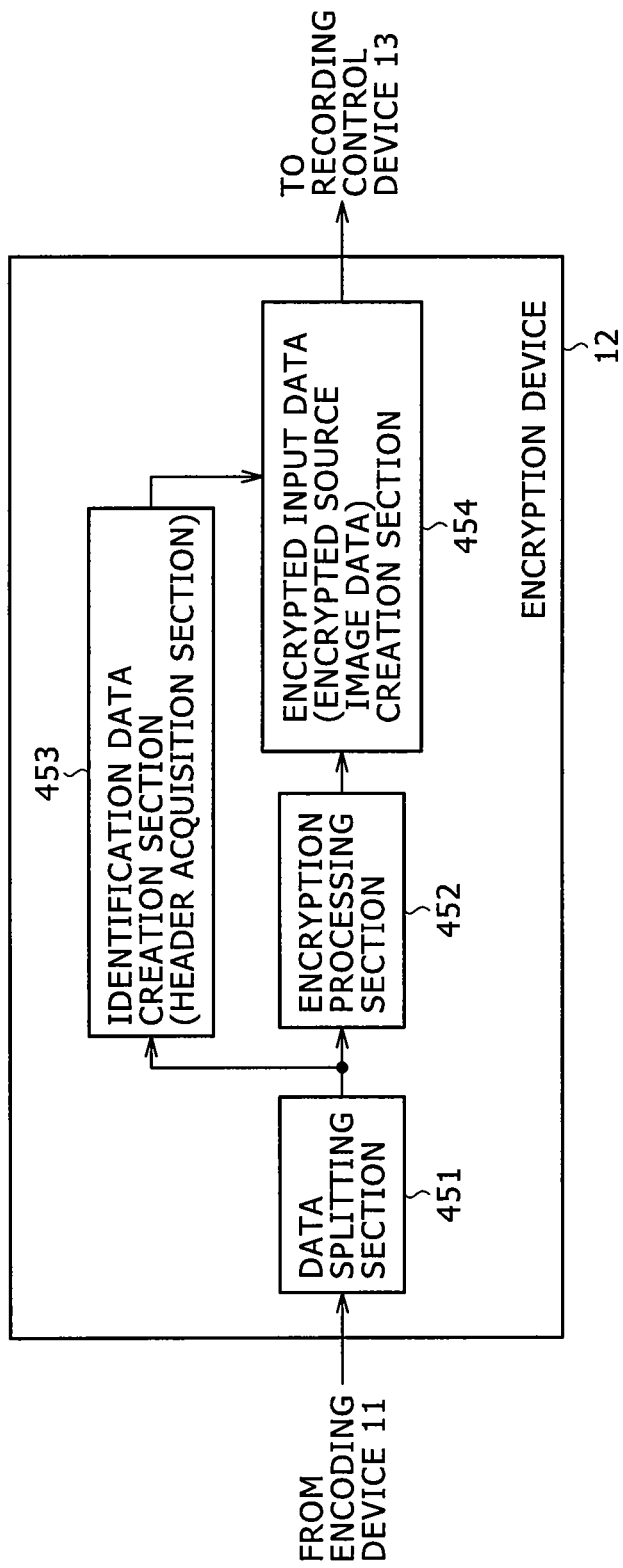
FIG. 23 is a block diagram showing a detailed structure of the encryption device in FIG. 1 according to the present invention.

FIG. 23 shows a detailed functional structure of the encryption device 12 capable of a series of processes such as the first through the fourth processes outlined above. That is, FIG. 23 indicates in detail how the encryption device 12 may be typically structured in terms of functionality.

As shown in FIG. 23, the encryption device 12 includes a data splitting section 451, an encryption processing section 452, an identification data creation section 453, and an encrypted input data creation section 454. These component sections 451 through 454 carry out the first through the fourth process described above, respectively.

If the input data is layered-encoded image data according to JPEG 2000 as mentioned above, then the header containing SIZ, COD, PLM, and/or PLT may be appropriated for the identification data. In such a case, the identification data creation section 453 may be regarded as a header acquisition device that acquires headers from layered-encoded image data as per JPEG 2000.

If the input data is layered-encoded image data according to JPEG 2000 as described above, then the encrypted input data refers to encrypted source image data. In this case, the encrypted input data creation section 454 may be regarded as an encrypted source image data creation device.

Figure 24:
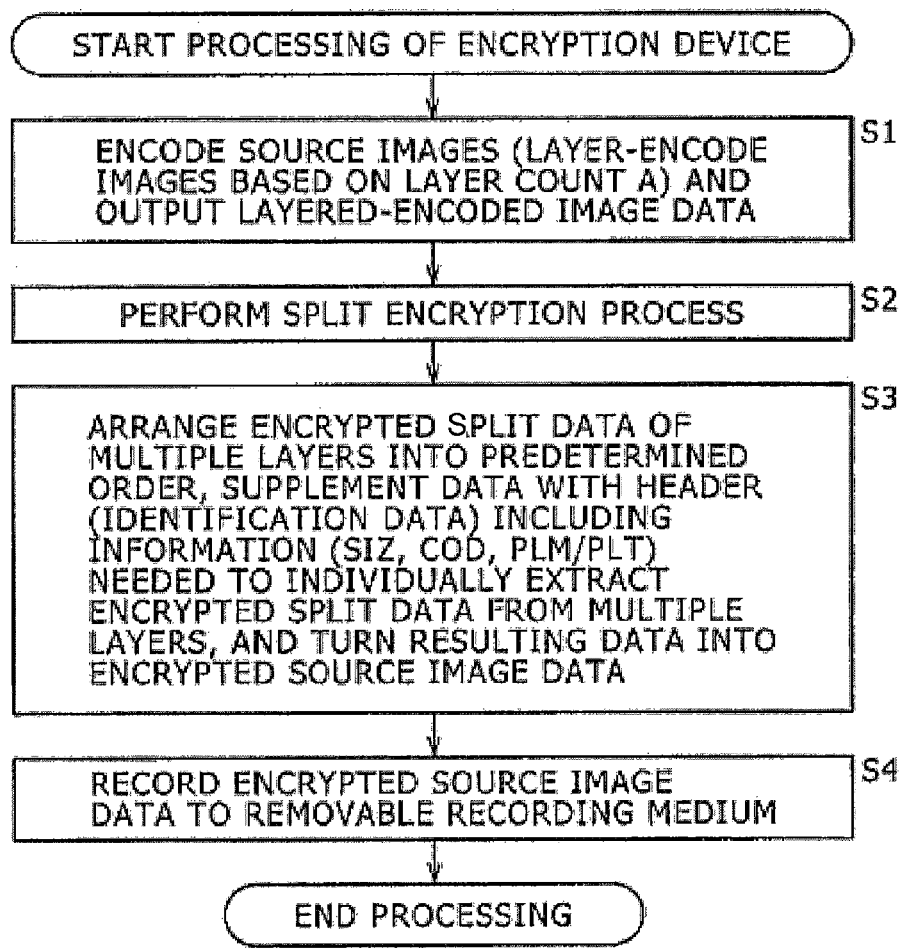
FIG. 24 is a flowchart of steps performed by an encryption apparatus included in FIG. 1.

Described below with reference to the flowchart of FIG. 24 is how processing is typically performed by the encryption apparatus 1 in FIG. 1 which incorporates the encryption device 12 having the functional structure shown in FIG. 23.

In step S1, the encoding device 11 encodes the source image and outputs the resulting layered-encoded image data.

More specifically, the encoding device 11 in step S1 layered-encodes the source image according to JPEG 2000 in such a manner that the number of layers will become A (A is any integer of at least 1) for a target type of quality. Illustratively, in the examples of FIGS. 18 through 22 above, the target quality type was shown to be spatial resolution and the layer count A to be one or two. In the example of FIG. 18, the layer count A is two when the layered-encoded image data composed of the packets corresponding to R0 and R1 is output. In the example of FIG. 20, by contrast, the layer count A is one when the layered-encoded image data constituted by the packets corresponding to R0 only is output.

In such cases, not only SIZ and COD defined as mandatory markers to be written under JPEG 2000 but also PLM or PLT defined as an optional marker will be used by the decryption device 2 in identifying layer-by-layer encrypted split data items as described above. This requires the encoding device 11 to write necessary information using not only SIZ and COD in the main header but also PLM in the main header or PLT in the tile header.

When the layered-encoded image data output by the encoding device 11 is supplied to the encryption device 12, control is passed on to step S2.

In step S2, as mentioned above, the encryption device 12 splits the layer-by-layer encoded data (of the target quality type) out of the layered-encoded image data and individually encrypts each of the split encoded data items on each layer. This step provides layer-by-layer encrypted split data.

What takes place in step S2 will be referred to as the split encryption process in the ensuing description. The split encryption process will be discussed later in detail with reference to the flowchart of FIG. 25.

In step S3, the encrypted input data creation section 454 of the encryption device 12 in FIG. 23 arrays the layer-by-layer encrypted split data items derived from the split encryption process of step S2 into a predetermined order, and adds to the data array a header part (i.e., identification information created by the identification data creation section 453 in FIG. 23) containing information (SIZ, COD, PLM and/or PLT) needed for the encrypted split data items on each layer to be extracted. The resulting data is provided as encrypted source image data.

If the layered-encoded image data coming from the process of step S1 is encoded data according to JPEG 2000, then the above-mentioned predetermined order is the same as the packet progression in the layered-encoded image data under JPEG 2000. In such a case, the header of the layered-encoded image data according to JPEG 2000 is appropriated for the identification data with no change added to it (examples were discussed above in reference to FIGS. 18 through 22).

When the encrypted source image data created by the encryption device 12 is supplied to the recording control device 13, control is passed on to step S4.

In step S4, the recording control device 13 records the encrypted source image data to the removable recording medium 3.

This terminates the processing of the encryption apparatus 1.

Figure 25:
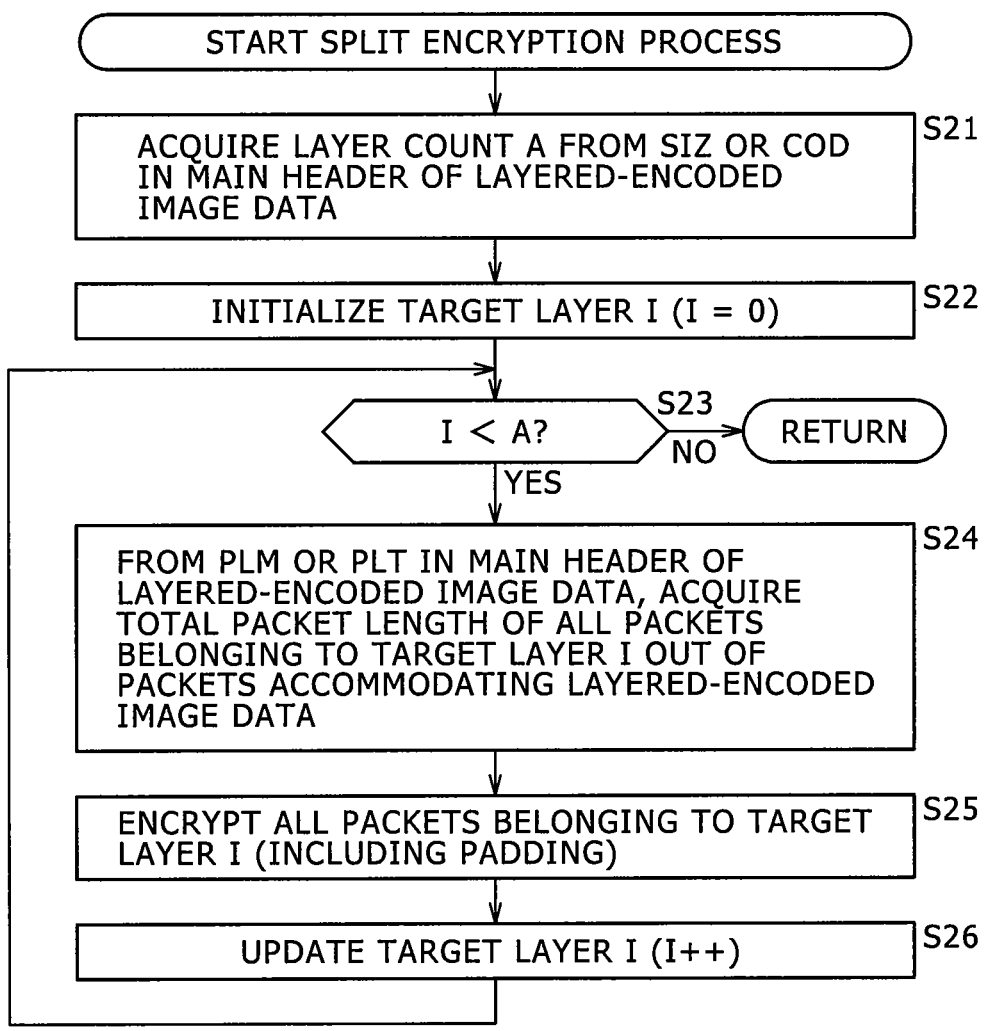
FIG. 25 is a flowchart of steps constituting a split encryption process included in FIG. 24.

The split encryption process in step S2 will now be described in detail with reference to the flowchart of FIG. 25.

In step S21, the data splitting section 451 in FIG. 23 (part of the encryption device 12 in FIG. 1) acquires a layer count A from SIZ or COD in the main header of the layered-encoded image data.

More specifically, when the layered-encoded image data 201 in FIG. 18 is supplied to the data splitting section 451, the layer count A obtained in step S21 is two.

In step S22, the data splitting section 451 initializes the layer I targeted for processing (called the target layer I hereunder). At this point, the target layer I is set to level zero.

In step S23, the data splitting section 451 checks to determine whether the target layer I is smaller than the layer count A (I<A).

Since the target layer I is zero and the layer count A is two in the current example, the data splitting section 451 determines in step S23 that the target layer I is smaller than the layer count A (I<A) and goes to step S24.

In step S24, based on PLM or PLT in the main header of the layered-encoded image data, the data splitting section 451 acquires the total packet length of all packets belonging to the target layer I from among the packets in the layered-encoded image data.

That is, the data unit in which to perform encryption (split unit) equals the total packet length of all packets contained in the same layer. The total packet length is the sum of packet lengths acquired from PLM or PLT. In such cases, if the SOP marker is found to be added, the six-byte SOP needs to be added to each packet. The presence or absence of SOP is specified in the main header which may be referenced for the marker as needed.

From the layered-encoded image data, the data splitting section 451 extracts (splits) the portion identified by the total packet length thus calculated and supplies the encryption processing section 452 with what is extracted as the encoded data on the target layer I. Specifically, since the target layer I is zero at this point, the total packet length ranging from the packet211 to the packet 213 is calculated in the example of FIG. 18. As a result, the packets 211 through 213 are split from the layered-encoded image data 201 and supplied to the encryption processing section 452.

In step S25, the encryption processing section452 encrypts the packets belonging to the target layer I, i.e., the data portion identified by the total packet length calculated in step S24 out of the layered-encoded image data.

More specifically, with the target layer I currently set to zero, the packets 211 through 213 on the spatial resolution layer of level zero (corresponding to R0) are encrypted in the example of FIG. 18. This provides encrypted split data 262.

If padding is needed at this point, the encryption processing section 452 adds padding to the last block before proceeding with encryption. Illustratively, with the target layer I set to zero, the encryption processing section 452 adds padding zero to the packets 211 through 213 on the spatial resolution layer of level zero (corresponding to R0) as shown in FIG. 19. This provides encrypted split data 282.

In step S26, the data splitting section 451 increments the target layer I by one (I++) before returning to step S23. The subsequent steps are then repeated.

Specifically, with the target layer I updated to one, the packets 214 through 216 are split from the layered-encoded image data 201 (i.e., established as the target data to be encrypted) in the process of step S24 in the example of FIG. 18. In step S25, the packets 214 through 216 are encrypted. This provides encrypted split data 263.

However, if padding is required, then the encrypted split data 283 in FIG. 19 will be obtained.

In step S26, the target layer I is updated to two. Since the layer count A is currently set to two, the result of the check in step S23 is negative ("No") and the split encryption process is thus brought to an end. That is, the process of step S2 in FIG. 24 is terminated, and step S3 is carried out.

In the example of FIG. 18, the identification data creation section (header acquisition section) 453 acquires the header (ranging from SOC to SOD) of the layered-encoded image data 201, appropriates the acquired header for a header (identification data) 261, and supplies the header 261 to the encrypted input data (encrypted source image data) creation section 454.

At this point, the encrypted input data creation section 454 is also fed with the encrypted split data 262 and encrypted split data 263 coming from step S2. Thus in step S3, the encrypted input data creation section 454 arrays the header (identification data) 261, encrypted split data 262, encrypted split data 263, and EOC 264 in the same order of the original packet progression so as to create data 251; and outputs the data 251 as encrypted source image data to the recording control device 13 in FIG. 1

If padding has been carried out, the encrypted source image data 271 shown in FIG. 19 will be obtained and supplied to the recording control device 13.

In the next step S4, the encrypted source image data 251 in FIG. 18 or the encrypted source image data271 in FIG. 19 is thus recorded to the removable recording medium 3.

What was described above with reference to FIGS. 24 and 25 was the typical example of the processing performed by the encryption apparatus 1 in FIG. 1.

Figure 26:
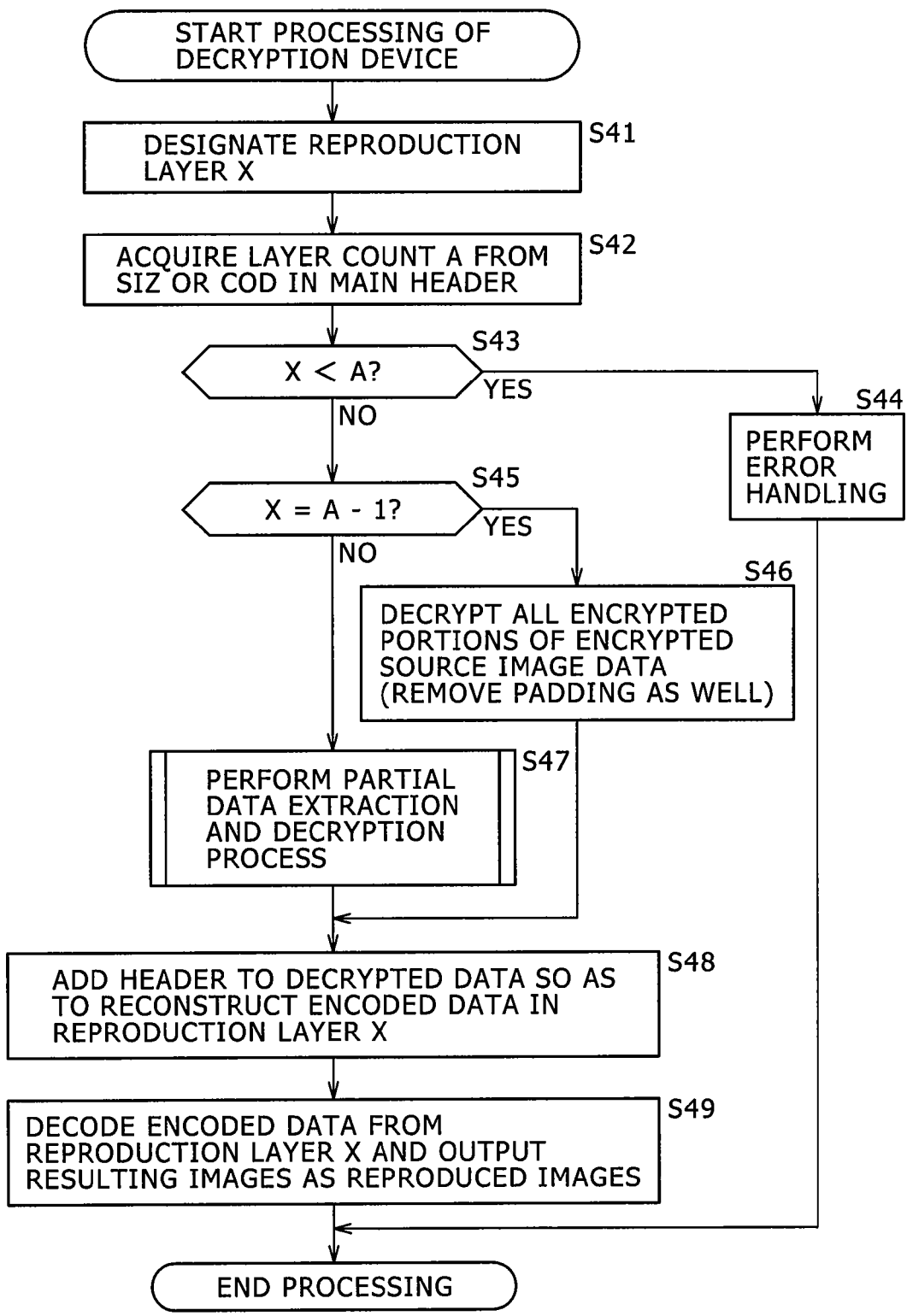
FIG. 26 is a flowchart of steps performed by a decryption apparatus included in FIG. 1.

Described below in reference to the flowchart of FIG. 26 is an example of the processing carried out by the decryption apparatus 2. The processing by the decryption apparatus 2 in this context deals with the encrypted source image data recorded to the removable recording medium 3 as a result of the processing in FIGS. 24 and 25 discussed above. The processing by the decryption apparatus 2 is thus a series of steps in which to decrypt and decode at least part of the encrypted source image data.

In step S41, the reproduction layer designation device 21 in the decryption apparatus 2 designates a reproduction layer X (any integer of at least 1) for a given type of quality. The reproduction layer designation device 21 notifies the extraction device 22 of the designated reproduction layer X.

In step S42, the extraction device 22 acquires a layer count A regarding the quality type in question from SIZ or COD in the main header of the encrypted source image data recorded on the removable recording medium 3.

Illustratively, suppose that the encrypted source image data 251 in FIG. 18 discussed above is recorded on the removable recording medium 3. In this case, the layer count A for spatial resolution is found to be two in step S42.

In step S43, the extraction device 22 checks to determine whether the reproduction layer X is smaller than the layer count A (X<A).

If in step S43 the extraction device 22 determines that the reproduction layer X is equal to or larger than the layer count A (i.e., if the result of the check in step S43 is negative ("No")), then step S44 is reached. In step S44, appropriate error handling is carried out and the processing is brought to an end.

Specifically, if the reproduction layer X is set to be at least two, then the result of the check in step S43 is negative ("No")

and error handling is executed in step S44. The reason for this handling is that since the spatial resolution layer is solely level zero or level one in the example of FIG. 18, the reproduction layer X can only be set to zero or one.

By contrast, if the reproduction layer X is set to be zero or one, then the result of the check in step S43 is affirmative ("Yes"). In this case, step S45 is reached.

In step S45, the reproduction layer 22 checks to determine whether the reproduction layer X is smaller than the layer count A by one (X=A−1).

The relation "X=A−1" indicates that the reproduction layer X for the target quality type is the highest (i.e., the highest level inherent in the source image). Illustratively, since the highest layer for spatial resolution is currently level one, the designation of "1" for the reproduction layer X signifies that reproduction with the highest spatial resolution (on level one) is specified.

In that case, the extraction device 22 in step S45 determines that X=A−1 and proceeds to acquire the encrypted source image data as a whole from the removable recording medium 3. The acquired data is supplied to the decryption device 23.

In the current example, the decryption device 23 is fed with the encrypted source image data 251 shown in FIG. 18.

In step S46, the decryption device 23 decrypts the whole encrypted portion of the encrypted source image data. In this example, the encrypted split data 262 and the encrypted split data 263 are both decrypted in step S46. As a result, the packets 211 through 216 are all constructed.

If the decryption device 23 is supplied with padded encrypted source image data such as the encrypted source image data 271 in FIG. 19, the decryption device23 decrypts the encrypted data portion and the removes the padded portions (padding zero and padding one in the example of FIG. 19).

In step S48, the decryption device 23 adds a header part to the decrypted data so as to reconstruct the encoded data on the reproduction layer X.

In the current example, what is reconstructed is the encoded data with its reproduction layer X set to level one for spatial resolution. That is, the layered-encoded image data 201 shown in FIG. 18 is reconstructed.

When the reconstructed encoded data is sent from the decryption device 23 to the decoding device 24, step S49 is reached.

In step S49, the decoding device 24 decodes the encoded data on the reproduction layer X according to JPEG 2000 and outputs the resulting image signal as a reproduced image. In the current example, what is output as the reproduced image is an image signal with its spatial resolution layer set to level one (i.e., the highest spatial resolution level inherent in the source image). This brings the processing by the decryption apparatus 2 to an end.

By contrast, if the designated reproduction layer X is lower than the highest layer (e.g., if the reproduction layer X is set to level zero in this example), the result of the check in step S45 is negative ("No"). In that case, control is passed on to step S47.

In step S47, from the encrypted source image data recorded on the removable recording medium 3, the extraction device 22 extracts the encrypted split data necessary for reproduction (i.e., decoding) on the reproduction layer X for the target quality type. The extracted data is supplied to the decryption device 23. The decryption device 23 decrypts only the encrypted split data that has been extracted.

In the current example, the reproduction layer X is set to level zero for spatial resolution. As a result, what is extracted and decrypted is the encrypted split data 262 corresponding to R0 out of the encrypted source image data 251 shown in FIG. 18. It is assumed that the unencrypted portions, i.e., the header 261 and EOC 264 in the example of FIG. 18, are extracted substantially at the same time.

Figure 27:
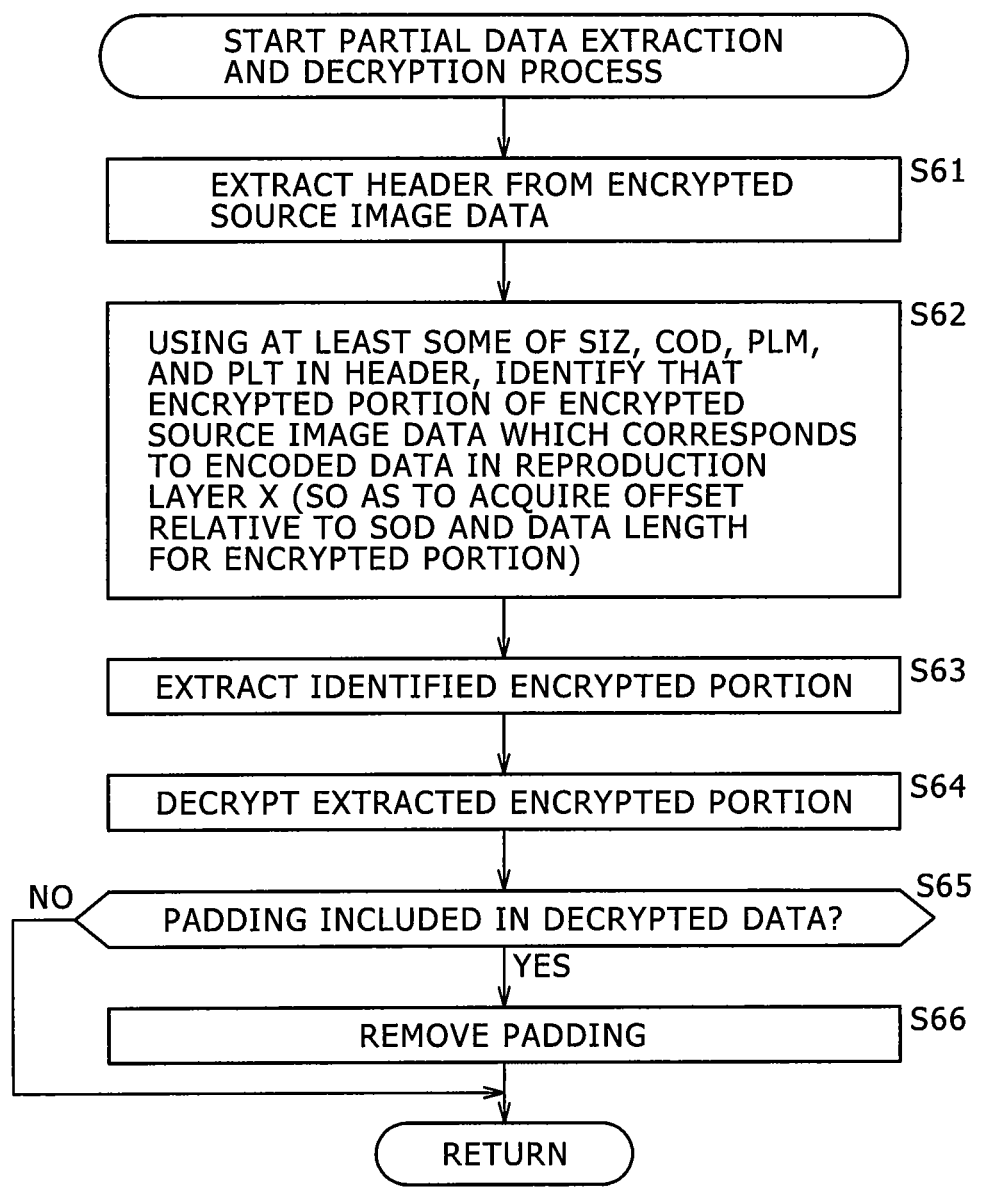
FIG. 27 is a flowchart of steps constituting a partial data extraction and decryption process included in FIG. 26.

What takes place in step S47 will be referred to as the partial data extraction and decryption process in the ensuing description. The partial data extraction and decryption process, detailed steps of which are indicated in the flowchart of FIG. 27, will now be described with reference to that flowchart.

In step S61, the extraction device 22 extracts the header of the encrypted source image data recorded on the removable recording medium 3.

Figure 28:
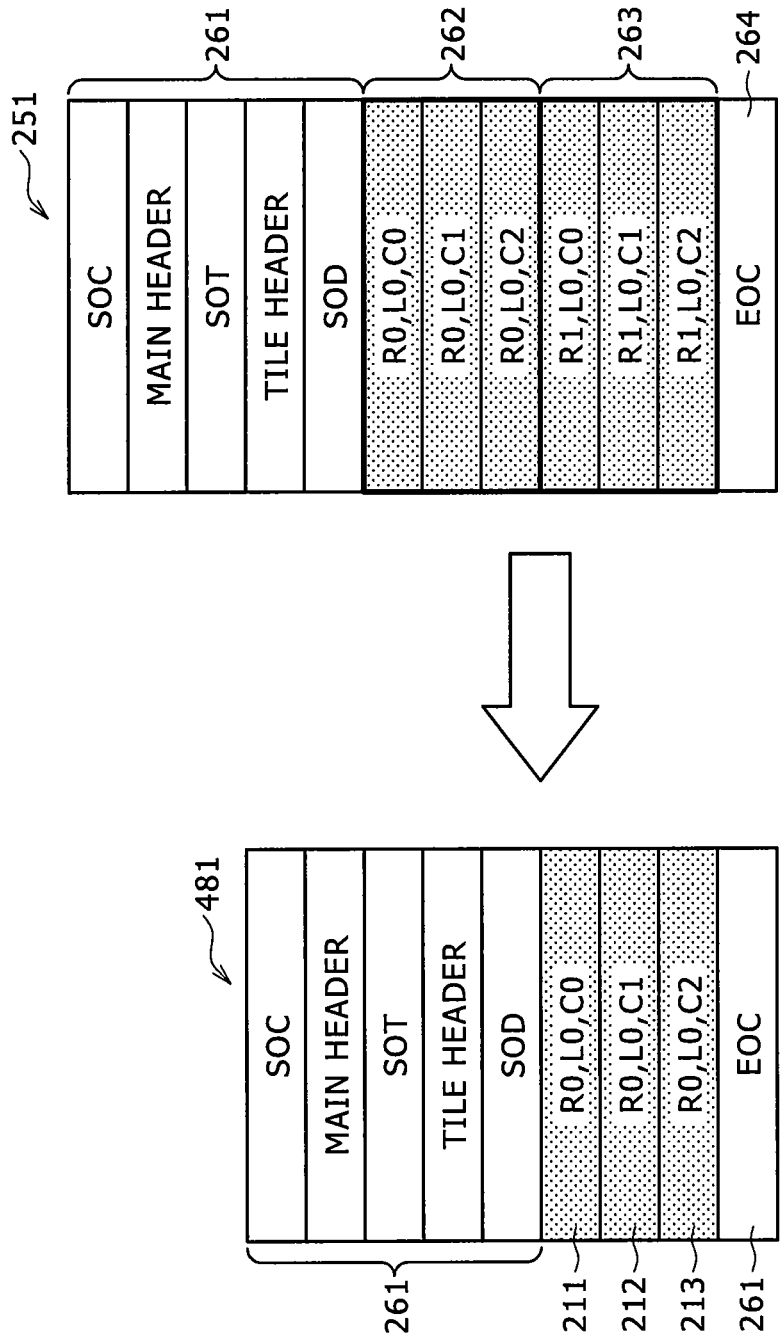
FIG. 28 is a schematic view showing results of processing performed by the decryption apparatus in FIGS. 26 and 28.

In the current example, the header 261 of the encrypted source image data 251 shown in FIG. 28 (the same as the encrypted source image data 251 in FIG. 18) is extracted.

In step S62, based on at least part of SIZ, COD, PLM, and PLT in the extracted header, the extraction device 22 identifies the encrypted portion corresponding to the encoded data on the reproduction layer X from among the encrypted source image data. That is, the extraction device 22 obtains both the offset of the encrypted portion relative to SOD and the data length of that portion.

In step S63, the extraction device 22 extracts the encrypted portion thus identified (i.e., at least one relevant encrypted split data item) from the encrypted source image data recorded on the removable recording medium 3. The encrypted data portion thus extracted is supplied to the decryption device 23.

In the current example, the encrypted split data262 is extracted from the encrypted source image data 251 shown in FIG. 28 and forwarded to the decryption device23. At the same time, the header 261 and EOC 264 are also sent to the decryption device 23.

In step S64, the decryption device 23 decrypts the encrypted portion thus extracted.

In the current example, the encrypted split data262 shown in FIG. 28 is decrypted. This provides the packets 211 through 213.

In step S65, the decryption device 23 checks to determine whether the decrypted data contains any padding.

Since no padding is included as evident from FIG. 28 in the current example, the result of the check in step S65 is negative ("No"). This brings the partial data extraction and decryption process to an end.

By contrast, if the encrypted split data 282 shown in FIG. 19 is decrypted, then the packets 211 through 213 are acquired together with the padding (padding zero). In this case, the result of the check by the decryption device 23 in step S65 is affirmative ("Yes"). Step S66 is then reached and the padding is removed. This brings to an end the partial data extraction and decryption process.

When the partial data extraction and decryption process is terminated in the manner described above, i.e., upon completion of step S47 in FIG. 26, control is passed on to step S48. The subsequent steps are then carried out.

In the current example, the processing in step S48 places the header 261 ahead of the packets 211 through 213 followed by the EOC 261 as shown in FIG. 28. This step reconstructs encoded data 481 with the spatial resolution of level zero.

In step S49, the encoded data 481 is decoded. The resulting image signal with the spatial resolution of level zero (i.e., image signal with its spatial resolution reduced relative to the source image having the spatial resolution of level one) is output as the reproduced image.

The foregoing description has been about the information processing system practiced as one embodiment of the present invention. The system was shown to include the encryption apparatus 1 and decryption apparatus 2 and to be functionally structured as depicted in FIG. 1.

However, it should be noted that the above embodiment is only an illustration of the present invention and is not limitative thereof in any way. Many other modifications and alternatives of the invention may be conceived or devised by those skilled in the art.

Figure 29:
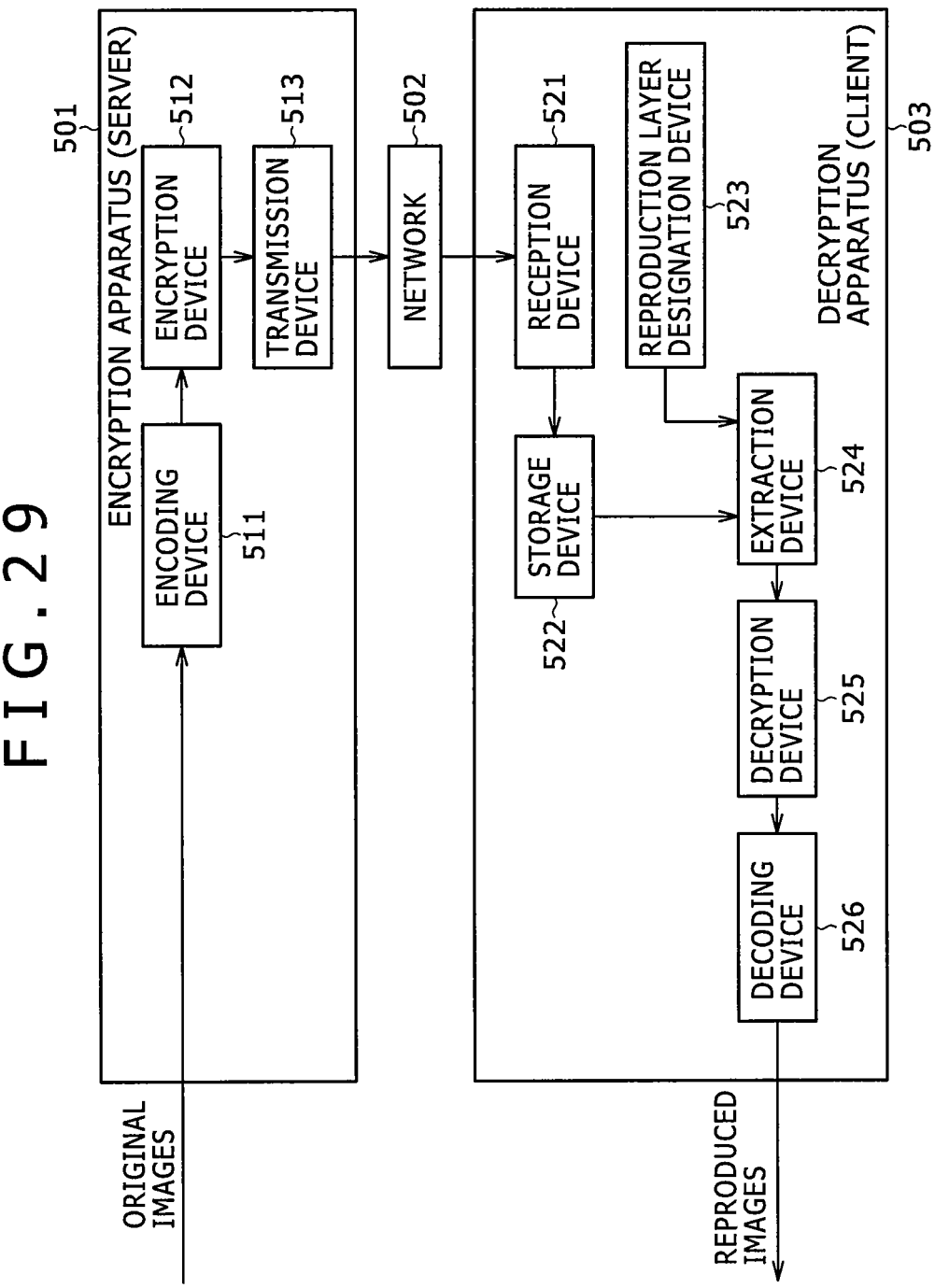
FIG. 29 is a block diagram showing another functional structure of the information processing system according to the present invention.

For example, the present invention may be applied to another information processing system such as one illustrated in FIG. 29. FIG. 29 is a block diagram showing a functional structure of such an information processing system according to the present invention.

As shown in FIG. 29, this information processing apparatus is also made up of an encryption apparatus 501 and a decryption apparatus 503.

In the information processing system of FIG. 1, the encrypted source image data was shown supplied from the encryption apparatus 1 to the decryption apparatus 2 by way of the removable recording medium 3. In the information processing system of FIG. 29, by contrast, encrypted source image data is sent from the encryption apparatus 501 to the decryption apparatus 503 by way of communication (streaming) over a network 502. In such a case, the encryption apparatus 501 may illustratively be a server that delivers contents (source images), and the decryption apparatus 503 may illustratively be a client capable of downloading the contents under management by the user.

The encryption apparatus 501 is thus characterized by the presence of a transmission device 513 for controlling communications over the network 502, in addition to an encoding device 511 and an encryption device 512. The transmission device 513 is capable of transmitting (i.e., delivering) the encrypted source image data coming from the encryption device 512 to the decryption apparatus 503 over the network 502.

The encoding device 511 and encryption device 512 basically have the same structures as those of the encoding device 11 and encryption device 12 in FIG. 1 and thus will not be described further.

In addition to the usual components ranging from a reproduction layer designation device 523 to a decoding device 526, the decryption apparatus 503 includes a reception device 521 for controlling communications over the network 502 and a storage device 522 typically composed of a hard disk drive. The reception device 521 stores into the storage device 522 the encrypted source image data (content data) coming from the encryption apparatus 501 via the network 502. In this structure, an extraction device 524 extracts data as needed from the encrypted source image data which is not found on a removable recording medium but is stored in the storage device 522.

The components ranging from the reproduction layer designation device 523 to the decoding device 526 basically have the same structures as those of their counterparts ranging from the reproduction layer designation device 21 to the decoding device 24 in FIG. 1 and thus will not be described further. It should be noted that the extraction device 524 has the additional ability to read data from the storage device 522.

According to the present invention, the setup of FIG. 1 and that of FIG. 29 can be easily combined to form another information processing apparatus that can utilize both the removable recording medium 3 and the network 502 as means for delivering encrypted source image data.

Where data is delivered in streaming mode using the network 502, PLT may be used more advantageously than PLM as a source of information from which to obtain packet length. That is because only one PLM exists for an entire image whereas PLT is furnished for each of the tiles involved in the image. It follows that when only part of the tiles are transmitted instead of all tiles, the use of the PLT marker reduces overhead and allows each transmitted tile to be controlled easily.

In streaming mode, the presence of the network is not mandatory as a communication route. There are no constraints on how or where to set up the suitable path for communication.

In addition to the information processing systems described above, the present invention may also be applied to a single information processing apparatus such as a hard disk-based recording and reproduction apparatus.

Figure 30:
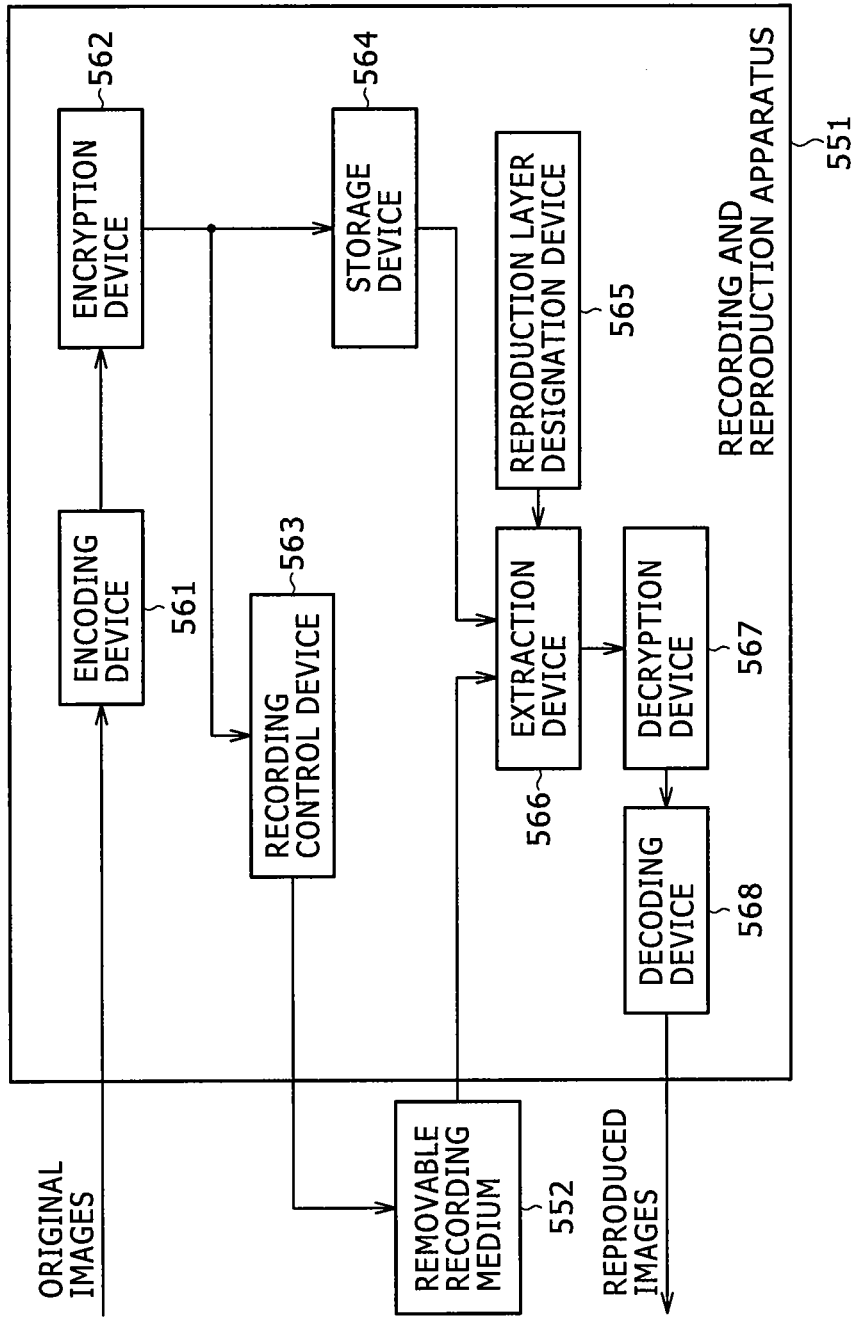
FIG. 30 is a block diagram showing a functional structure of an information processing apparatus according to the present invention.

More specifically, the present invention may be practiced in implementing a recording and reproduction apparatus 551 shown in FIG. 30. FIG. 30 is a block diagram showing a functional structure of the recording and reproduction apparatus 551 as an information processing apparatus according to the present invention.

As illustrated in FIG. 30, the recording and reproduction apparatus 551 has components ranging from an encoding device 561 to a decoding device 568.

The components ranging from the encoding device 561 to a recording control device 563 basically have the same structures as those of their counterparts ranging from the encoding device 11 to the recording control device 13 in FIG. 1 and thus will not be described further.

A storage device 564 is illustratively constituted by a hard disk drive that can store the encrypted source image data output by an encryption device 562.

The components ranging from a reproduction layer designation device 565 to the decoding device 568 basically have the same structures as those of their counterparts ranging from the reproduction layer designation device 21 to the decoding device 24 in FIG. 1 and thus will not be described further. However, it should be noted that an extraction device 566 has both the ability to read data from a removable recording medium 552 and the ability to read data from the storage device 564.

The series of steps or processes described above may be executed either by hardware or by software.

Specifically, a personal computer such as one shown in FIG. 31 may be used to implement individually the encryption apparatus 1 and decryption apparatus 2 shown in FIG. 1, the encryption apparatus 501 and decryption apparatus 503 in FIG. 29, and the recording and reproduction apparatus 551.

In the structure of FIG. 31, a CPU (central processing unit) 601 performs diverse processes in accordance with programs held in a ROM (read only memory) 602 or in keeping with the program loaded from a storage device 608 into a RAM (random access memory) 603. The RAM 603 also accommodates data that may be needed by the CPU 601 in carrying out its processing.

The CPU 601, ROM 602, and ROM 603 are interconnected by a bus 604. The bus 604 is also connected with an input/output interface 605.

The input/output interface 605 is connected to an input device 606, an output device 607, the storage device 608, and a communication device 609. The input device 606 is constituted illustratively by a keyboard and a mouse, the output device 607 by a display unit, the storage unit 608 by a hard disk drive, and the communication device 609 by a modem and a terminal adapter. The communication device 609 conducts communications with another information processing apparatus over networks such as the Internet.

A drive 610 is connected to the input/output interface 605 as needed. A removable recording medium611 such as a magnetic disk, an optical disk, a magneto-optical disk, or a semiconductor memory may be loaded into the drive 610. Computer programs read by the drive610 from the loaded recording medium are installed as needed into the storage device 608.

Where the series of steps or processes are to executed by software, the programs constituting the software may be either incorporated beforehand in dedicated hardware of the computer or installed upon use over a network or from a suitable recording medium into a general-purpose personal computer or like equipment capable of executing diverse functions based on the installed programs.

As shown in FIG. 31, the recording medium carrying such programs is offered to users not only as a removable recording medium (package media) 611 apart from their apparatus and constituted by a magnetic disk (including floppy disks), an optical disk (including CD-ROM (compact disk-read only memory) and DVD (digital versatile disk)), a magneto-optical disk (including MD (Mini-disk)), or a semiconductor memory; but also in the form of the ROM 602 or the hard disk drive constituting the storage device 608, each accommodating the programs and incorporated beforehand in the apparatus.

In this description, the steps describing the programs stored on the recording medium represent not only the processes that are to be carried out in the depicted sequence (i.e., on a time series basis) but also processes that may be performed parallelly or individually and not chronologically.

In this description, the term "system" refers to an entire configuration made up of a plurality of component devices and processing apparatuses.

As described above, where the server 501 holds encrypted source image data illustratively as part of the network delivery model shown in FIG. 29, it is possible to extract data having the bit rate and spatial resolution level compatible with the communication environment of the network 502 or with the device performance of the client 503. This setup permits data delivery without recourse to repeated encoding or encryption processes.

The arrangements above also apply to the model shown in FIG. 1, i.e., the model in which encrypted source image data is packaged. From encrypted content data, it is possible to extract data in encrypted form having qualifications compatible with the performance of the reproduction device or with the capability (spatial resolution) of the display medium. This setup also permits data delivery without requiring repeated encoding or encryption processes.

It might happen that images of high bit rates or high levels of spatial resolution are available but cannot be decrypted using the decryption key Key1 currently in the possession of a client. In such a case, the client may secretly acquire another decryption key Key2 from the server and additionally enjoy the images decrypted using the additional key. Likewise where part of the image has been encrypted using another key, the client may acquire a newly issued decryption key to decrypt the hitherto-undecrypted part of the image.

As described, contents may be delivered and reproduced in a layered manner without the need for repeated encoding or encryption processes. Where a plurality of keys are used to encrypt contents, new keys may be issued for subsequent selective decryption, or each user may be allowed to have limited access to the encrypted contents. In like manner, part of a given image may be kept secret as desired.

In other words, according to the present invention, it is possible to bring about techniques of data encryption and decryption with the JPEG 2000-based layered structure kept intact. According to one such technique, it is easy to encrypt a given image file and extract part of that image file in such a manner that an encrypted image with a low spatial resolution level is extracted. According to another inventive technique, an encrypted image with a low bit rate can be readily extracted.

Where the present invention is applied, it is also possible to encrypt each image not only in terms of spatial resolution and bit rate but also in terms of geometrical selectivity. That is, only a desired geometrical part of a given image may be encrypted. That image part cannot be decoded correctly without proper keys and can thus be kept secret with ease.

Where such inventive techniques are used in combination, it is possible to encrypt images in terms of spatial resolution, bit rate, and geometrical selectivity simultaneously as desired. Part of a single image file may be extracted in any of these terms.

As described, the present invention can be practiced advantageously where images need to be modified in terms of bit rate or spatial resolution so as to comply with network (e.g., Internet) requirements. The invention can also be implemented easily in connection with the digital cinema environment where security consciousness is high.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing system comprising:
   a first information processing apparatus configured to: (a) encrypt at least part of input data; and (b) output the encrypted data as encrypted input data; and
   a second information processing apparatus configured to decrypt at least part of said encrypted input data;
   said first information processing apparatus including:
   (a) a first processor; and
   (b) a first memory device operatively coupled to the first processor, the first memory device storing instructions which when executed by the first processor cause the first processor to:
   (i) split said input data into a plurality of split data items in accordance with a predetermined rule, said plurality of split data items including a first split data item of a first tile and a second split data item of the first tile, and a third split data item of a second tile and a fourth split data item of the second tile;
   (ii) for a first target layer of the input data, acquire a first length of data belonging to said first target layer;
   (iii) for a second target layer of the input data, acquire a second length of data belonging to said second target layer;
   (iv) using said acquired first length of data, encrypt the first split data item using a first spatial resolution level encryption key before outputting the encrypted first split data item;
   (v) using said acquired second length of data, encrypt the second split data item using a second spatial resolution level encryption key before outputting the encrypted second split data item;
   (vi) for the first target layer of the input data, acquire a third length of data belonging to said first target layer;

(vii) for the second target layer of the input data, acquire a fourth length of data belonging to said second target layer;

(viii) using said acquired third length of data, encrypt the third split data item using the first spatial resolution level encryption key with before outputting the encrypted third split data item;

(ix) using said acquired fourth length of data, encrypt the fourth split data item using the second spatial resolution level encryption key before outputting the encrypted fourth split data item;

(x) create identification data for individually identifying each of said encrypted split data items, said identification data identifying a position and a size of each of said encrypted split data items when: (A) said identification data; (B) said encrypted split data items; and (C) the unencrypted split data items yet to be encrypted out of said plurality of split data items are arrayed in a predetermined order;

(xi) create said encrypted input data as data constituted by: (A) said identification data; (B) said encrypted split data items; and (C) said unencrypted split data items arrayed in said predetermined order; and (xii) deliver said encrypted input data to said second information processing apparatus; and said second information processing apparatus including:

(a) a second processor; and (b) a second memory device operatively coupled to the second processor, the second memory device storing instructions which when executed by the second processor, cause the second processor to:

(i) extract part of all said encrypted split data items included in said encrypted input data, in accordance with said identification data included in said delivered encrypted input data; and (ii) decrypt the encrypted split data items extracted from said encrypted split data items included in said delivered encrypted input data.

2. A method of operating an information processing system, the information processing system comprising: (a) a first information processing apparatus configured to: (i) encrypt at least part of input data; and (ii) output the encrypted data as encrypted input data; and (b) a second information processing apparatus configured to decrypt at least part of said encrypted input data, the method comprising:

causing said first information processing apparatus to:

(a) split said input data into a plurality of split data items in accordance with a predetermined rule, said plurality of split data items including a first split data item of a first tile and a second split data item of the first tile, and a third split data item of a second tile and a fourth split data item of the second tile;

(b) for a first target layer of the input data, acquire a first length of data belonging to said first target layer;

(c) for a second target layer of the input data, acquire a second length of data belonging to said second target layer;

(d) using said acquired first length of data, encrypt said first split data item using a first spatial resolution level encryption key before outputting the first encrypted split data item;

(e) using said acquired second length of data, encrypt the second split data item using a second spatial resolution level encryption key before outputting the encrypted second split data item;

(f) for the first target layer of the input data, acquire a third length of data belonging to said first target layer;

(g) for the second target layer of the input data, acquire a fourth length of data belonging to said second target layer;

(h) using said acquired third length of data, encrypt said third split data item using the first spatial resolution level encryption key before outputting the third encrypted split data item;

(i) using said acquired fourth length of data, encrypt the fourth split data item using the second spatial resolution level encryption key before outputting the encrypted fourth split data item;(j) create identification data for individually identifying each of said encrypted split data items, said identification data identifying a position and a size of each of said encrypted split data items when: (A) said identification data; (B) said encrypted split data items; and (C) the unencrypted split data items yet to be encrypted out of said plurality of split data items are arrayed in a predetermined order;

(k) create said encrypted input data as data constituted by: (A) said identification data; (B) said encrypted split data items; and (C) said unencrypted split data items arrayed in said predetermined order; and (l) deliver said encrypted input data to said second information processing apparatus; and causing said second information processing apparatus to:

(a) extract part of all said encrypted split data items included in said encrypted input data, in accordance with said identification data included in said delivered encrypted input data; and (b) decrypt the encrypted split data items extracted from said encrypted split data items included in said delivered encrypted input data.

3. An information processing apparatus for encrypting at least part of input data and outputting the encrypted data as encrypted input data, said information processing apparatus comprising:

a processor; and a memory device operatively coupled to the processor, the memory device storing instructions which when executed by the processor, cause the processor to:

(a) split said input data into a plurality of split data items, said plurality of split data items including a first split data item of a first tile and a second split data item of the first tile, and a third split data item of a second tile and a fourth split data item of the second tile;

(b) for a first target layer of the input data, acquire a first length of data belonging to said first target layer;

(c) for a second target layer of the input data, acquire a second length of data belonging to said second target layer;

(d) using said acquired first length of data, encrypt the first split data item using a first spatial resolution level encryption key before outputting the encrypted first split data item;

(e) using said acquired second length of data, encrypt the second split data item using a second spatial resolution level encryption key before outputting the encrypted second split data item;

(f) for the first target layer of the input data, acquire a third length of data belonging to said first target layer;

(g) for the second target layer of the input data, acquire a fourth length of data belonging to said second target layer;

(h) using said acquired third length of data, encrypt the third split data item using the first spatial resolution level encryption key with before outputting the encrypted third split data item;

(i) using said acquired fourth length of data, encrypt the fourth split data item using the second spatial resolution level encryption key before outputting the encrypted fourth split data item;

(j) create identification data for individually identifying each of said encrypted split data items, said identification data identifying a position and a size of each of said encrypted split data items when: (i) said identification data; (ii) said encrypted split data items; and (iii) the unencrypted split data items yet to be encrypted out of said plurality of split data items are arrayed in a predetermined order; and (k) create said encrypted input data as data constituted by: (i) said identification data; (ii) said encrypted split data items; and (iii) said unencrypted split data items arrayed in said predetermined order.

4. The information processing apparatus of claim 3, wherein the instructions, when executed by the processor, cause the processor to:

(a) input said input data as layered-encoded image data acquired by having given image data layered-encoded in accordance with a predetermined layered-encoding standard; and (b) split the input layered-encoded image data into layer-by-layer encoded data items constituting said split data items.

5. The information processing apparatus of claim 4, wherein the instructions, when execute by the processor, cause the processor to:

(a) if said predetermined layered-encoding standard is JPEG 2000, acquire a header of said layered-encoded image data including any of SIZ (image and tile size), COD (coding style default), PLM (packet length, main header), and PLT (packet length, tile-part header) so as to appropriate said header for said identification data instead of creating said identification data anew; and (b) create as said encrypted input data an array of said unencrypted split data items including said header of said layered-encoded image data for said identification data, and of said encrypted split data items, in keeping with an array sequence of packets making up said layered-encoded image data.

6. A method of operating an information processing apparatus configured to: (a) encrypt at least part of input data; and (b) the encrypted data as encrypted input data, said information processing apparatus including instructions, said method comprising:

causing a processor to execute the instructions to:

(a) split said input data into a plurality of split data items in accordance with a predetermined rule, said plurality of split data items including a first split data item of a first tile and a second split data item of the first tile, and a third split data item of a second tile and a fourth split data item of the second tile;

(b) for a first target layer of the input data, acquire a first length of data belonging to said first target layer;

(c) for a second target layer of the input data, acquire a second length of data belonging to said second target layer;

(d) using said acquired first length of data, encrypt the first split data item using a first spatial resolution level encryption key before outputting the encrypted first split data item;

(e) using said acquired second length of data, encrypt the second split data item using a second spatial resolution level encryption key before outputting the encrypted second split data item;

(f) for the first target layer of the input data, acquire a third length of data belonging to said first target layer;

(g) for the second target layer of the input data, acquire a fourth length of data belonging to said second target layer;

(h) using said acquired third length of data, encrypt the third split data item using the first spatial resolution level encryption key with before outputting the encrypted third split data item;

(i) using said acquired fourth length of data, encrypt the fourth split data item using the second spatial resolution level encryption key before outputting the encrypted fourth split data item;

(j) create identification data for individually identifying each of said encrypted split data items, said identification data identifying a position and a size of each of said encrypted split data items when: (i) said identification data; (ii) said encrypted split data items; and (iii) the unencrypted split data items yet to be encrypted out of said plurality of split data items are arrayed in a predetermined order; and (k) create said encrypted input data as data constituted by: (i) said identification data; (ii) said encrypted split data items; and (iii) said unencrypted split data items arrayed in said predetermined order.

7. A non-transitory computer-readable medium storing instructions for causing a computer to:

(a) encrypt at least part of input data;

(b) output the encrypted data as encrypted input data;

(c) split said input data into a plurality of split data items in accordance with a predetermined rule, said plurality of split data items including a first split data item of a first tile and a second split data item of the first tile, and a third split data item of a second tile and a fourth split data item of the second tile;

(d) for a first target layer of the input data, acquire a first length of data belonging to said first target layer;

(e) for a second target layer of the input data, acquire a second length of data belonging to said second target layer;

(f) using said acquired first length of data, encrypt the first split data item using a first spatial resolution level encryption key before outputting the encrypted first split data item;

(g) using said acquired second length of data, encrypt the second split data item using a second spatial resolution level encryption key before outputting the encrypted second split data item;

(f) for the first target layer of the input data, acquire a third length of data belonging to said first target layer;

(g) for the second target layer of the input data, acquire a fourth length of data belonging to said second target layer;

(h) using said acquired third length of data, encrypt the third split data item using the first spatial resolution level encryption key with before outputting the encrypted third split data item;

(i) using said acquired fourth length of data, encrypt the fourth split data item using the second spatial resolution level encryption key before outputting the encrypted fourth split data item;

(j) create identification data for individually identifying each of said encrypted split data items, said identification data identifying a position and a size of said encrypted split data items when: (i) said identification data; (ii) said encrypted split data items; and (iii) the unencrypted split data items yet to be encrypted out of said plurality of split data items are arrayed in a predetermined order; and (k) create said encrypted input data as data constituted by: (i) said identification data; (ii) said encrypted split data items; and (iii) said unencrypted split data items arrayed in said predetermined order.

8. An information processing apparatus for use when given data is split into a plurality of split data items in accordance with a predetermined rule, said plurality of split data items including a first split data item of a first tile and a second split data item of the first tile, and a third split data item of a second tile and a fourth split data item of the second tile, for a first target layer of the input data, a first length of data which belongs to said first target layer is acquired, for a second target layer of the input data, a second length of data which belongs to said second target layer is acquired, the first split data item being encrypted using said acquired first length of data and a first spatial resolution level encryption key, the second split data item being encrypted using said acquired second length of data and a second spatial resolution level encryption key, for the first target layer of the input data, a third length of data which belongs to said first target layer is acquired, for the second target layer of the input data, a fourth length of data which belongs to said second target layer is acquired, the third split data item being encrypted using said acquired third length of data and the first spatial resolution level encryption key, the fourth split data item being encrypted using said acquired fourth length of data and a second spatial resolution level encryption key, identification data being created for individually identifying each of said encrypted split data items, the data creation being performed in such a manner that said identification data identifies a position and a size of each of said encrypted split data items when: (a) said identification data; (b) said encrypted split data items; and (c) the unencrypted split data items yet to be encrypted out of said plurality of split data items are arrayed in a predetermined order, said encrypted input data being created as data constituted by: (a) said identification data; (b) said encrypted split data items; and (c) said unencrypted split data items arrayed in said predetermined order, said encrypted input data being delivered to said information processing apparatus which decrypts at least part of said encrypted input data, said information processing apparatus comprising:

a processor; and a memory device operatively coupled to the processor, the memory device storing instructions which when executed by the processor, cause the processor to:

(a) extract part of all said encrypted split data items included in said encrypted input data, in accordance with said identification data included in said encrypted input data; and (b) decrypt the encrypted split data items from said encrypted split data items included in said encrypted input data.

9. The information processing apparatus of claim 8, wherein:

(a) said given data is input as layered-encoded image data acquired by having given image data layered-encoded in accordance with a predetermined layered-encoding standard, said layered-encoded image data being split into layer-by-layer encoded data items constituting said split data items which are delivered to said information processing apparatus as said encrypted input data; and (b) the instruction, when execute by the processor, cause the processor to:

(i) designate the layer from which to reproduce said given image data; and (ii) based on said identification data included in said encrypted input data, extract the encrypted split data items corresponding to said designated layer out of all said encrypted split data items included in said encrypted input data.

10. The information processing apparatus of claim 9, wherein the instructions, when executed by the processor, cause the processor to, if (a) said predetermined layered-encoding standard is JPEG 2000, (b) a header of said layered-encoded image data is appropriated for said identification data, and (c) said unencrypted split data items including said header and said encrypted split data items are arrayed in keeping with an array sequence of packets making up said layered-encoded image data, the resulting data array being delivered as said encrypted input data, then, based on any of SIZ (image and tile size), COD (coding style default), PLM (packet length, main header) and PLT (packet length, tile-part header), extract the encrypted split data items corresponding to said layer out of all said encrypted split data items included in said encrypted input data.

11. A method of operating an information processing apparatus when given data is split into a plurality of split data items in accordance with a predetermined rule, said plurality of split data items including a first split data item of a first tile and a second split data item of the first tile, and a third split data item of a second tile and a fourth split data item of the second tile, for a first target layer of the input data, a first length of data which belongs to said first target layer is acquired, for a second target layer of the input data, a second length of data which belongs to said second target layer is acquired, the first split data item being encrypted using said acquired first length of data and a first spatial resolution level encryption key, the second split data item being encrypted using said acquired second length of data and a second spatial resolution level encryption key, for the first target layer of the input data, a third length of data which belongs to said first target layer is acquired, for the second target layer of the input data, a fourth length of data which belongs to said second target layer is acquired, the third split data item being encrypted using said acquired third length of data and the first spatial resolution level encryption key, the fourth split data item being encrypted using said acquired fourth length of data and a second spatial resolution level encryption key, identification data being created for individually identifying each of said encrypted split data items, the data creation being performed in such a manner that said identification data identifies a position and a size of each of said encrypted split data items when said identification data, said encrypted split data items, and the unencrypted split data items yet to be encrypted out of said plurality of split data items are arrayed in a predetermined order, said encrypted input data being created as data constituted by said identification data, said encrypted split data items, and said unencrypted split data items arrayed in said predetermined order, said encrypted input data being delivered to said information processing apparatus which decrypts at least part of said encrypted input data, the method comprising:

causing a processor to execute the instructions to extract part of all said encrypted split data items included in said encrypted input data, in accordance with said identification data included in said encrypted input data; and causing the processor to execute the instructions do decrypt the encrypted split data items from said encrypted split data items included in said encrypted input data.

12. A non-transitory computer readable medium storing instructions for causing a computer to:

(a) control a procedure when given data is split into a plurality of split data items in accordance with a predetermined rule, said plurality of split data items including a first split data item of the first tile and a second split data item of the first tile, and a third split data item of a second tile and a fourth split data item of the second tile, for a first target layer of the input data, a first length of data which belongs to said first target layer is acquired, for a second target layer of the input data, a second length of data which belongs to said second target layer is acquired, the first split data item being encrypted using said acquired first length of data and a first spatial resolution level encryption key, the second split data item being encrypted using said acquired second length of data and a second spatial resolution level encryption key, for the first target layer of the input data, a third length of data which belongs to said first target layer is acquired, for the second target layer of the input data, a fourth length of data which belongs to said second target layer is acquired, the third split data item being encrypted using said acquired third length of data and the first spatial resolution level encryption key, the fourth split data item being encrypted using said acquired fourth length of data and a second spatial resolution level encryption key, identification data being created for individually identifying each of said encrypted split data items, the data creation being performed in such a manner that said identification data identifies a position and a size of each of said encrypted split data items when said identification data, said encrypted split data items, and the unencrypted split data items yet to be encrypted out of said plurality of split data items are arrayed in a predetermined order, said encrypted input data being created as data constituted by said identification data, said encrypted split data items, and said unencrypted split data items arrayed in said predetermined order, said encrypted input data being delivered to said procedure which decrypts at least part of said encrypted input data;

(b) extract part of all said encrypted split data items included in said encrypted input data, in accordance with said identification data included in said encrypted input data; and (c) decrypt the encrypted split data items from said encrypted split data items included in said encrypted input data.

* * * * *